United States Patent [19]

Schwartz et al.

[11] Patent Number: 5,442,510
[45] Date of Patent: Aug. 15, 1995

[54] CONTROL SYSTEM FOR TRACKING NONLINEAR SYSTEMS

[75] Inventors: Ira B. Schwartz, Bethesda, Md.;
Ioana Triandaf, Alexandria, Va.;
Thomas L. Carroll, Alexandria, Va.;
Louis M. Pecora, Alexandria, Va.

[73] Assignee: The United States of America as represented by the Secretary of the Navy, Washington, D.C.

[21] Appl. No.: 80,155

[22] Filed: Jun. 23, 1993

[51] Int. Cl.6 .............................................. G05B 13/02
[52] U.S. Cl. .................................. 364/152; 364/148
[58] Field of Search ............................. 364/148-194, 364/500; 372/27, 31, 26, 25, 38, 33; 250/205

[56] References Cited

U.S. PATENT DOCUMENTS

| | | | |
|---|---|---|---|
| H322 | 8/1987 | Simons | 372/29 |
| 3,958,109 | 5/1976 | Doherty et al. | 364/164 |
| 4,734,914 | 3/1988 | Shikawa | 372/33 |
| 4,796,266 | 1/1989 | Banwell et al. | 372/38 |
| 4,837,428 | 6/1989 | Takagi et al. | 250/205 |
| 4,879,459 | 11/1989 | Negishi | 250/205 |
| 4,903,273 | 2/1990 | Bathe | 372/38 |
| 5,019,769 | 5/1991 | Levinson | 372/31 |
| 5,025,447 | 6/1991 | Ohashi | 372/31 |
| 5,027,362 | 6/1991 | Hokanson et al. | 372/38 |
| 5,057,992 | 10/1991 | Traiger | 364/148 |

(List continued on next page.)

OTHER PUBLICATIONS

Peng et al., "Controlling Chemical Chaos", J. Phys. Chem., 1991, 95, pp. 4957-4959.
Bandyopadhyay et al, "On Dynamic Control of Chaos: A Study with Reference to a Reacting System", Physics Letters A 166, 1992, pp. 197-204.
Singer et al, "Controlling a Chaotic System", Physical Review Letters, vol. 66, No. 9, 4 Mar. 1991, pp. 1123-1125.
Ditto et al., "Experimental Control of Chaos", Physical Review Letters, vol. 65, No. 26, 24 Dec. 1990, pp. 3211-3214.
Bracikowski et al., "Chaos in a Multimode Solid-State Laser System", Chaos, vo. 1, No. 1, pp. 49-64 date unknown.
Gills et al., "Tracking Unstable Steady States: Extending the Stability Regime of a Multimode Laser System", Physical Review Letters, vol. 69, No. 22, 30 Nov. 1992, pp. 3169-3171.
Roy et al., "Dynamical Control of a Chaotic Laser: Experimental Stabilization of a Globally Coupled System", (List continued on next page.)

Primary Examiner—Roy N. Envall, Jr.
Assistant Examiner—Jim Trammell
Attorney, Agent, or Firm—Thomas E. McDonnell; Daniel Kalish

[57] ABSTRACT

A control system for tracking the operation of a nonlinear system has two parts: a tracking subsystem and a controlling subsystem. The tracking subsystem generates a parametric signal and the controlling subsystem controls and stabilizes the nonlinear system operating under operating conditions corresponding to that parametric signal. The controlling subsystem includes a modulator responsive to the parametric signal and to a feedback signal for producing and applying an input signal to the nonlinear system to cause the nonlinear system to produce an output signal. The controlling subsystem also includes means responsive to the output signal for producing the feedback signal. The controlling subsystem also includes correcting means, operable when the time average of the feedback signal is substantially nonzero, for bringing the time average of the feedback signal from a substantially nonzero value to a substantially zero value, and maintaining means, operable when the time average of the feedback signal is substantially zero, for maintaining the time average of the feedback signal over the selected period of time at a substantially zero value.

44 Claims, 11 Drawing Sheets

U.S. PATENT DOCUMENTS

| | | | |
|---|---|---|---|
| 5,084,887 | 1/1992 | Ohashi | 372/38 |
| 5,091,843 | 2/1992 | Deczkowski | 364/150 |
| 5,123,023 | 6/1992 | Santarelli et al. | 372/38 |
| 5,128,950 | 7/1992 | Tsuchiya et al. | 372/25 |
| 5,150,289 | 9/1992 | Badavas | 364/154 |
| 5,151,910 | 9/1992 | Inuyama et al. | 372/31 |
| 5,159,660 | 10/1992 | Lu et al. | 364/165 |
| 5,163,063 | 11/1992 | Yoshikawa et al. | 372/38 |
| 5,175,678 | 12/1992 | Frerichs et al. | 364/148 |
| 5,187,713 | 2/1993 | Kwa | 372/26 |
| 5,285,377 | 2/1994 | Sugasaka et al. | 364/148 |

OTHER PUBLICATIONS

Physical Review Letters, vol. 68, No. 9, 2 Mar. 1992, pp. 1259-1262.

Hunt, "*Stabilizing High-Period Orbits in a Chaotic System: The Diode Resonator*", Physical Review Letters, vol. 67, No. 15, 7 Oct. 1991, pp. 1953-1955.

AuerBach et al., "*Controlling Chaos in High Dimensional Systems*", Physical Review Letters, vol. 69, No. 24, 14 Dec. 1992, pp. 3479-3482.

Ott et al., "*Controlling Chaos*", Physical Review Letters, vol. 64, No. 11, 12 Mar. 1990, pp. 1196-1199.

CONTROL SYSTEM FOR TRACKING NONLINEAR SYSTEMS

FIELD OF THE INVENTION

The present invention relates to control of nonlinear systems, and more particularly to a control system for tracking the operation of a nonlinear system, such as a laser or electronic system, over a range of operating conditions.

DESCRIPTION OF THE RELATED ART

Classical control techniques utilize instantaneous feedback or feedback based on sampling. Such techniques are generally based on linear or small signal modeling. However, in the absence of robust, accurate, analytical models, it is difficult to control nonlinear systems with such techniques. Some nonlinear systems, such as multimode lasers with nonlinear crystals, are not amendable to accurate modeling. Classical control of such systems may be performed, if at all, on a trial and error basis and may be extremely difficult, expensive and inflexible. When control in such systems is lost, very little is done except to recognize such loss of control. See, e.g., U.S. Pat. No. 5,163,063 to Yoshikawa et al.

Recent developments in nonlinear dynamics have shown that most nonlinear systems have steady-state, periodic or chaotic attractors in phase space. The chaotic attractors contain an infinite number of unstable periodic orbits. A technique (the "OGY technique") has been reported for stabilizing the nonlinear system in the neighborhood of unstable orbits by directing subsequent iterates towards the local stable manifold of the selected orbit. Ott, Grebogi and Yorke, "Controlling Chaos," Phys. Rev. Lett. 64 1196, (1190). Upon application of the OGY technique, the nonlinear system remains on that particular orbit. The literature reports application of the OGY technique to stabilize diode resonators and lasers, to suppress (laminarize) chaotic flow in a thermal convection loop, to control a parametrically driven magnetoelastic ribbon, and to control a nonisothermal consecutive chemical reaction.

Application of the OGY technique is not feasible if the periodic orbit or unstable steady state near which control is desired is not known. Furthermore, some operating conditions which are not in the neighborhood of any identifiable orbit will not be accessible to control. In addition, the OGY technique is not amendable to tracking the system over a wide range of operating conditions since the control becomes less effective as the operating point is brought further away from the orbit or state.

SUMMARY OF THE INVENTION

It is an object of the invention to control nonlinear systems.

Another object of the invention is to control nonlinear systems without knowing the orbits of the nonlinear system near the operating conditions at which control is desired.

Another object of the invention is to control nonlinear systems without using robust, accurate, analytical models of the nonlinear systems, but rather directly using time series measurements.

A further object of the invention is to control nonlinear systems over a wide range of operating conditions.

A still further object of the invention is to control nonlinear systems over a selected range of operating conditions.

These and other objectives are achieved by a control system for tracking the operation of a nonlinear system, which nonlinear system produces an output signal in response to an input signal. The system of this invention has two parts: a tracking subsystem and a control subsystem. The tracking subsystem generates a parametric signal and the control subsystem controls and stabilizes the nonlinear system operating under operating conditions corresponding to that parametric signal.

The controlling subsystem includes a modulator responsive to the parametric signal and to a feedback signal for producing and applying an input signal to the nonlinear system to cause the nonlinear system to produce an output signal. The controlling subsystem also includes means responsive to the output signal for producing the feedback signal. The controlling subsystem also includes correcting means, operable when the time average of the feedback signal is substantially nonzero, for bringing the time average of the feedback signal from a substantially nonzero value to a substantially zero value, and maintaining means, operable when the time average of the feedback signal is substantially zero, for maintaining the time average of the feedback signal over the selected period of time at a substantially zero value. The control subsystem thereby controls and stabilizes the nonlinear system operating at the applied parametric signal. It brings the nonlinear system towards a desired orbit and stabilizes the nonlinear system near that orbit.

Starting with an initial parametric signal, the tracking subsystem varies the parametric signal slowly with respect to the adjustment time of the control subsystem. The parametric signal might be varied discretely or continuously. As the parametric signal is varied, the state on which the nonlinear system operates also changes, but the control subsystem acquires the corresponding unstable state and stabilizes operation of the nonlinear system on that state.

The invention thereby controls nonlinear systems. Control can be achieved without knowing the orbit about which control is desired, since the control subsystem brings the nonlinear system towards that orbit. Alternatively, the orbit can be ascertained by using known techniques, such as times series embedding techniques. This system uses experimental data in "real time" and does not depend on having robust, accurate, analytical models of the nonlinear system.

This control system provides for tracking over a range of operating conditions, including operating conditions which are not in the neighborhood of any identifiable orbit, and including over a selected range of operating conditions. This control system is thus capable of bringing the nonlinear system to operating conditions about which stabilization had previously been difficult.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Figure 1:
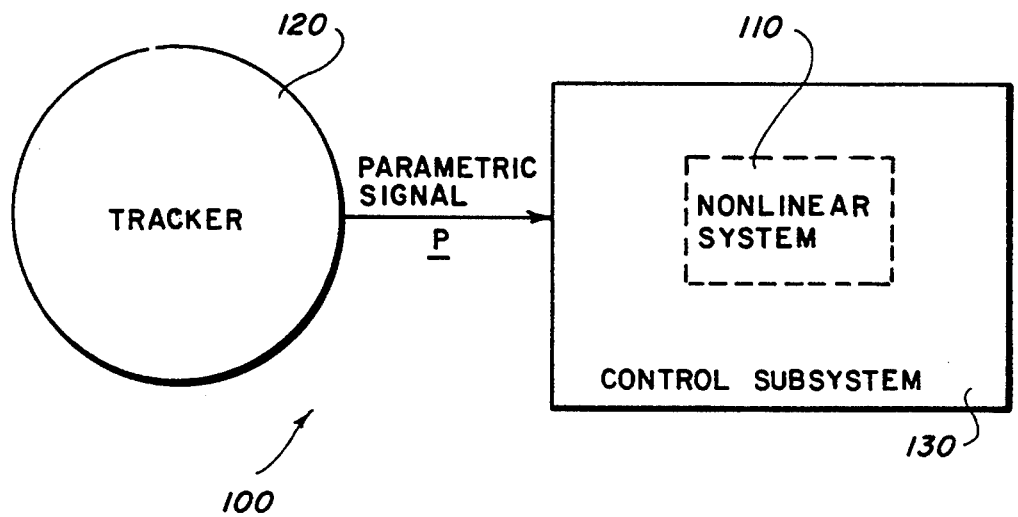
FIG. 1 shows a system for tracking and controlling a nonlinear system.

Referring now to the drawings, FIG. 1 shows a control system 100 for tracking a nonlinear system 110. The invention has broad scope and applies control to many nonlinear systems 110, such as lasers and nonlinear optical devices, electronic circuits, coupled lasers, convection, chemical reactions and processes, structural mechanics, smart materials, robotics, nuclear reactors, extrusion of polymer melts, and biological systems such as hearts (cardiac arrhythmia), muscles (tremors), and nervous systems (epilepsy).

System 100 comprises a tracker 120 for generating a parametric signal P and applying it to a control subsystem 130, and the control subsystem 130 for controlling the nonlinear system 110 at the parametric signal P. The parametric signal P can be external to the nonlinear system 110, or it can be part of the nonlinear system 110. As an example of the latter condition, the parametric signal P can be the parametric value of a component (not shown) of the nonlinear system 110, such as a resistor or transistor.

Figure 2:
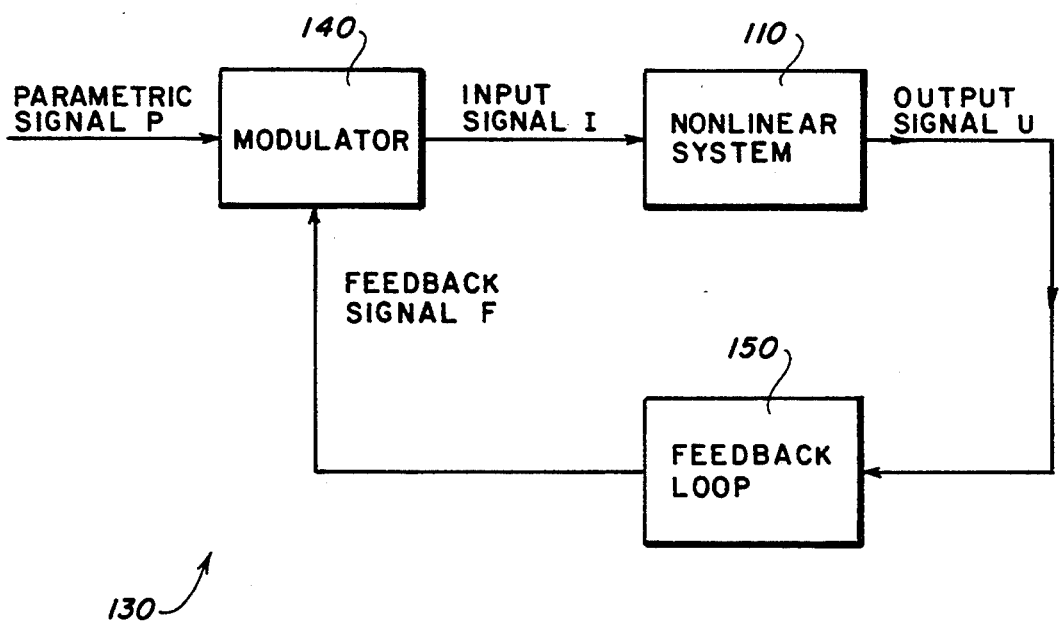
FIG. 2 shows the control subsystem of FIG. 1.

Referring now to FIG. 2, the control subsystem 130 is a feedback control system responsive to the applied parametric signal P. The parametric signal P may be considered the bias or dc value of the control subsystem 130, although the parametric signal P is not necessarily a direct current signal. A modulator 140 modulates or combines the parametric signal P by or with a feedback signal F to produce an input signal I for application to the nonlinear system 110. For example, the modulator 140 could perform amplitude modulation or frequency modulation. As a further example, the parametric signal P could be a dc signal, and the feedback signal could be considered a fluctuation signal. The modulator 140 could then sum the parametric signal P and the feedback signal F to produce the input signal I.

In response to the input signal I, the nonlinear system 110 produces an output signal U. Although the nonlinear system 110 need not be any particular type of system, the input signal I and the output signal U are preferably electrical signals. If the nonlinear system 110 is a laser, for example, it could include photodetector means (not shown) for converting light to an electrical signal I.

A feedback loop 150 responsive to the output signal U produces the feedback signal F. The control subsystem 130 typically uses a small amplitude control technique, although the nonlinear system 110 may show a nonlinear response when operated at the parametric signal P. As will be discussed further below, it is important that the average of the produced feedback signal F over a selected period of time be essentially zero.

Without restricting the scope of the invention, attention will now be paid to certain types of feedback loops 150 of particular interest to control of nonlinear systems. Of special interest is occasional proportional feedback (OPF), which is a form of the OGY technique. In both techniques, the feedback loop 150 produces the feedback signal F consisting of small, appropriately estimated perturbations in response to samples of output from the nonlinear system 110, each sample being taken over a short period of time. In other words, the output signal U consists of a sequence of signals $U_n$ with discrete values.

The theoretical underpinning for the OPF and OGY techniques starts with assuming that the nonlinear system 110 is a dynamical system. The evolution of the nonlinear system 110 dynamics may be represented by a state variable flow vector X(t,p), dependent on time t and parameter p, the value of the parametric signal.

The flow vector X(t,p) is constructed from a measured time series by the delay coordinate embedding technique, well known to persons of ordinary skill in the art. This flow vector X(t,p) is then converted to a state variable map vector $X_n(p)$ by sampling the flow vector X(t,p), for example by taking an experimental sequence of the output signal U at evenly spaced intervals. The state variable map vector $X_n(p)$ can be used to predict the output signal U. The map is described as $$\vec{X}_{n+1} = h(\vec{X}_n, p).$$

Figure 3:
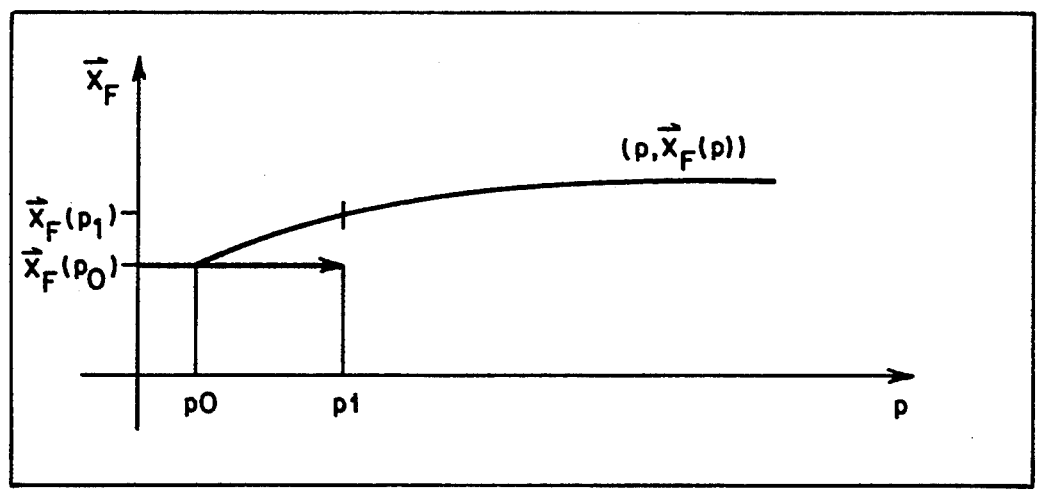
FIG. 3 is an example of a plot of the fixed point as the parametric value is varied.

Using known techniques of embedology, a reconstruction of the attractor for the nonlinear system 110 is obtained from the time series. Next, an experimental surface of section is obtained, from which a number of distinct periodic orbits can be determined. A particular periodic orbit is selected. For simplicity, the orbit will be referred to herein as a period one orbit, although the invention applies equally well to any periodic orbit of period one or higher or to unstable steady states. The selected periodic orbit of period one of the flow X(t,p) is a fixed point $X_F(p)$ of the map h, where $X_F(p) = h(X_F(p), p)$. As shown in FIG. 3, the fixed point $X_F(p)$ might vary as the parametric value p of the parametric signal P varies. In the neighborhood of the fixed point $X_F(p)$, this orbit has a stable manifold and an unstable manifold.

The following is an example of using the above-described theory to design a subsystem 130 for controlling the nonlinear system 110 in a neighborhood of a desired orbit, for example, the fixed point $X_F(p)$, on a chaotic attractor. A window is selected for the feedback signal F. If the n-th iteration of the feedback signal $F_n$ falls outside of that window, then the n-th iteration feedback signal $F_n$ is set to zero. In other words, control is left off. By the ergodic properties of chaotic attractors of nonlinear systems, the nonlinear system 110 will eventually fall within a neighborhood of the fixed point $X_F(p)$. If the n-th iteration brings the system within the window, then the output signal U at iteration n, $U_n$, is used to generate the iteration-n feedback signal $F_n$, subject to the window discussed earlier, so that the n+1 iteration of the surface of section space point $X_{n+1}$ will fall close to the stable manifold, and thereby stabilize operation of the nonlinear system 110. Define $\vec{e}_s$, $\vec{e}_u$, $\lambda_s$, and $\lambda_u$ as the eigenvectors and eigenvalues of the Jacobian of the map h for the stable and unstable manifolds, respectively. Further define $\vec{f}_s$ and $\vec{f}_u$ as the covariant basis vectors satisfying $$\vec{f}_s \cdot \vec{e}_s = \vec{f}_u \cdot \vec{e}_u = 1;$$

$$\vec{f}_s \cdot \vec{e}_u = \vec{f}_u \cdot \vec{e}_s = 0$$

and define $$g = \frac{\delta \vec{X}_F(p)}{\delta p}.$$

Using the local linear approximation $$\vec{X}_{n+1} = h(\vec{X}_n, p) \approx \vec{X}_F + B \cdot (\vec{X}_n - \vec{X}_F),$$

the expression for $X_{n+1}$ becomes $$\vec{X}_{n+1} \approx F_n \cdot g + [\lambda_u \vec{e}_u \vec{f}_u + \lambda_s \vec{e}_s \vec{f}_s] \cdot (\vec{X}_n - F_n \cdot g).$$

In practice, the value of g can be calculated experimentally once and kept constant for subsequent iterations during the control step for a particular value of the parametric signal P. The feedback signal $F_n$ based on the output signal $U_n$ for the n-th iteration is then determined as $$F_n = \frac{\lambda_u \vec{X}_n \cdot \vec{f}_u}{(\lambda_u - 1) g \cdot \vec{f}_u} = C \cdot \vec{X}_n, \quad (1)$$

where $$C = \frac{\lambda_u \vec{f}_u}{(\lambda_u - 1) g \cdot \vec{f}_u}.$$

The orbit about which control is desired can be readily determined by using standard embedding techniques as described above, and using the above-described theoretical formulation applied to the experimental data. This information is also useful in determining and selecting an initial parametric signal. This theoretical formulation is most useful in using the experimental data to determine the gain factor G, based on the above factor C, for use in the feedback loop 150. Such a feedback loop 150 would generate the n-th iterate feedback signal $F_n$ according to the equation $$F_n = G \cdot (U_n - U_{ref}), \quad (2)$$

where $U_{ref}$ is an output reference value or offset. $U_{ref}$ is typically an estimate of the fixed point.

The above-described formulation is not absolutely required for the practice of this invention. For example, in the case of operation in a nonchaotic regime, which may not have ergodic properties, other means can be used to bring the system near the fixed point. The orbit about which control is desired may readily be determined by means known to persons of ordinary skill in the art. For example, it could be determined by operating the nonlinear system 110 at different values of the parametric signal P and analyzing the output signal U in other ways. It could be determined by using a 2-dimensional return map, in which subsequent iterations are plotted against each other. In other words, the output would be plotted as $(U_1, U_2)$, $(U_2, U_3)$, $(U_3, U_4)$, .... The desired orbit could also be determined by using Poincaré sections.

The proportionality factor G in Eqn. (2) could also be empirically determined by means known to persons of ordinary skill in the art. The feedback loop 150 need not even use linear feedback for the practice of this invention.

The control subsystem 130 utilizing the feedback loop 150 as described above will stabilize the nonlinear system 110, but it will not necessarily bring the system closer to the fixed point $X_F(p)$. As shown in FIG. 3, if the control subsystem 130 had stabilized the nonlinear system 110 at parametric value $p_0$, then the nonlinear system would be operating near the fixed point $X_F(p_0)$. If the value of the parametric signal P is changed significantly, from $p_0$ to $p_1$, then the fixed point will change from $X_F(p_0)$ to $X_F(p_1)$. Upon initial application of parametric value $p_1$, the nonlinear system 110 might not be sufficiently close to the fixed point $X_F(p_1)$ and the control system might not stabilize the nonlinear system 130 at the altered value $p_1$ of the parametric signal P. In order to overcome this possibility, the invention has a further requirement: that the feedback loop 150 produce a feedback signal F with essentially zero time average over a selected period of time.

Figure 4:
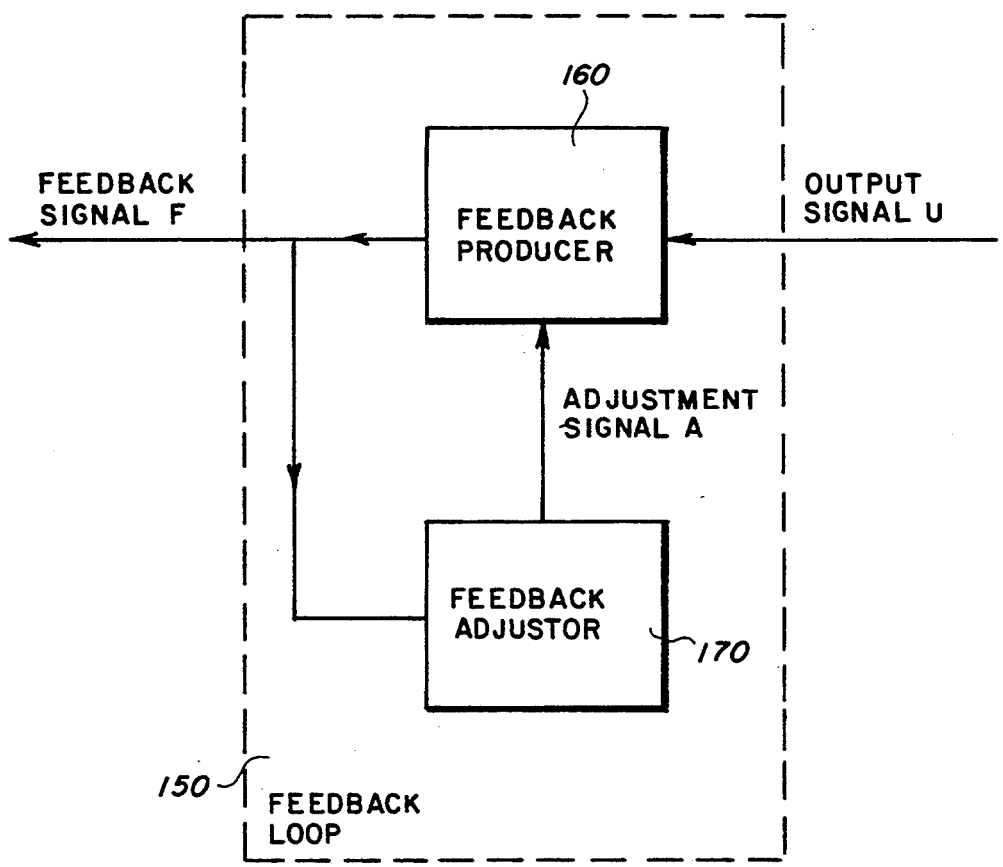
FIG. 4 shows an exemplary feedback loop of FIG. 2.

Referring now to FIG. 4, an exemplary feedback loop 150 includes a feedback producer 160 responsive to the output signal U and to an adjustment signal A for producing the feedback signal F. A feedback adjustor 170 samples and averages the feedback signal F over a selected period of time, for example, 100 discrete sampling periods, to produce the adjustment signal A so that the average of the feedback signal F is essentially zero. For example, for the feedback loop 150 producing a feedback signal according to Eqn. (2), the feedback adjustor 170 would produce an adjustment signal A corresponding to the output reference value $U_{ref}$. The feedback producer 160 subtracts the output reference value $U_{ref}$ from the output signal $U_n$ and multiplies the difference by the gain factor G to produce the feedback signal $F_n$. The feedback adjustor 170 iteratively adjusts the adjustment signal A (the output reference value $U_{ref}$) so that the feedback signal $F_n$ produced by the feedback producer 160 averages to zero over a selected period of time.

Upon initial application of the parametric signal P to the control subsystem 130 (FIGS. 1 and 2), the initially produced feedback signal F will generally not have a nonzero time average. It will reach a time average of essentially zero after an adjustment period of time. During the adjustment period, the control subsystem 130 (FIGS. 1 and 2) performs correction so that the feedback signal F, on average, becomes essentially zero after this adjustment period has elapsed. For control near a fixed point or unstable periodic orbit, the feedback signal F might very well continue to fluctuate about zero even after the adjustment period, but the time average of the feedback signal F will remain essentially zero.

The theory behind the operation of the exemplary feedback loop 150 of FIG. 4 is that if the feedback loop 150 is controlling the nonlinear system 110 but the nonlinear system 110 is not on the selected orbit, that is, if $X_n \neq X_F(p)$, then the average of the feedback signals will be nonzero, and will be proportional to the error, that is, the distance the nonlinear system 110 is from the correct fixed point, orbit, or unstable steady state by the equation $$<F_n> \simeq C \cdot < \| \vec{X}_n - \vec{X}_F(p) \| >.$$

In other words, the feedback signal F itself would have a positive or a negative dc bias.

A feedback adjustor 170 according to the above-described specification may be readily designed by a person of ordinary skill in the art using standard iteration control techniques.

Referring back to FIG. 2, in general, the control subsystem 130 is designed so that after the parametric signal P is initially applied and an adjustment period of time has elapsed, then the feedback loop 150 produces a feedback signal F whose average over a selected period of time is essentially zero. The exemplary design of the feedback loop 150 shown in FIG. 4 in the control subsystem 130 is but one example of a control subsystem 130 having this property. Another example is a control subsystem 130 which fortuitously operates on a periodic orbit or steady state, since the time average of the feedback signal will be essentially zero under such conditions. The adjustment period will be instantaneous for such a control subsystem 130. A control subsystem 130 having this property but with a different design than the above-described two designs can be readily designed by a person of ordinary skill in the art.

The "essentially zero" requirement must be read in light of the practical requirements of the system 100. It might be impractical to expect the feedback signal F to actually be zero in light of experimental error and noise, and how close to zero the average should be can be readily determined by a person of ordinary skill in the art.

The above discussion describes a system 100 for controlling the nonlinear system 110 at a single value of the parametric signal P generated by parametric generator 120.

Figure 5:
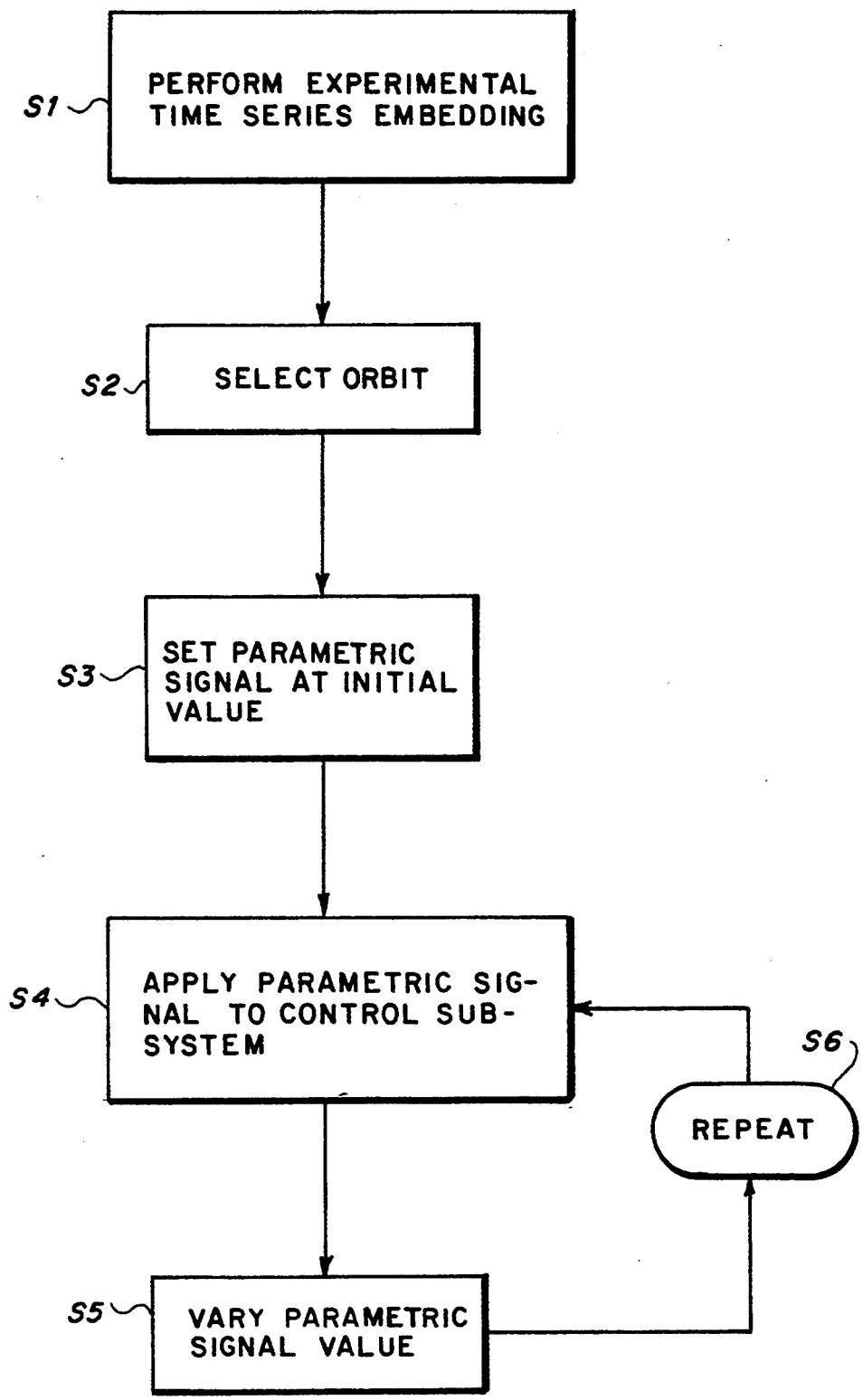
FIG. 5 is a flowchart of tracking operation of the invention of FIG. 1.

Turning now to FIG. 5, and FIGS. 1, and 2 the overall operation of the system 100 for use as a tracker will now be described.

Although not absolutely required for the practice of this invention, step $S_1$ is operation of the nonlinear system 110 without control to obtain a time series of experimental data. The experimental time series embedding discussed earlier is performed, and the data obtained as a result thereof is considered an embedding signal. This data/signal is useful for later steps. Step $S_2$, also optional, is selection of an orbit for tracking on. The embedding data/signal may be used for this step.

In step $S_3$, the tracker 120 sets the parametric signal P at an initial value. This initial parametric value may be selected, determined so as to satisfy specified conditions, or be otherwise set, for example, by default. If it is desired to operate the control subsystem 130 over a specified range of parametric values, the initial parametric value could be selected to be outside that range but near an end point of the range. Using the embedology data/signal, the initial parametric value is preferably selected so that upon application of the parametric signal P at the initial parametric value, the nonlinear system 110 operates on the selected orbit.

Step $S_4$ is application by the tracker 120 of the parametric signal P at the initial parametric value to the control subsystem 130 so that the nonlinear system 110 produces an initial output signal U. If the nonlinear system 110 operates in steady state at the initial parametric value, it is optional to operate the control subsystem 130 so as to produce a nonzero feedback signal F. In other words, under such conditions, the control subsystem 130 can be off.

In step $S_5$, the tracker 120 slowly varies the parametric value to produce a subsequent value of the parametric signal P, and applies the parametric signal P at the subsequent parametric value to the control subsystem 130 so that the nonlinear system produces a subsequent output signal U.

The steps $S_5$ of slowly varying the parametric value to produce a subsequent value of the parametric signal P, and $S_4$ of applying the parametric signal P at the subsequent parametric value to the control subsystem 130 so that the nonlinear system produces a subsequent output signal U are repeated as step $S_6$.

The slow variation of the parametric value may be performed iteratively, that is, with discrete variation of the parametric signal P. For each application of the parametric signal P to the control subsystem 130, the tracker 120 holds the value of the parametric signal P steady for the adjustment period. After the adjustment period has elapsed, the control subsystem 130 has brought the nonlinear system 110 to an orbit or steady state, and produced a feedback signal F with essentially zero time average. An iteration is performed whereby the parametric signal value is changed by a small amount, and the process is repeated. The modification of the parametric signal value must be kept small enough so that the nonlinear system 110 remains in a controllable neighborhood of an orbit, that is, so that the feedback signal F time average can be brought close to zero immediately upon application of each iterated subsequent parametric value. The Feedback loop 150 characteristics, such as the gain G and the offset $U_{ref}$, can also be adjusted with each iteration, for example, based on the embedding data.

The same considerations apply to continuous variation of the parametric value as apply to iterated variation. The variation should be slow enough so that the control subsystem 130 may bring the time average of the feedback signal F to essentially zero, and so that the feedback signal F time average remains sufficiently close to zero.

The parametric signal value may be selectively varied, thus permitting control over a desired range of operating conditions. It may also be allowed to drift, thereby providing control despite the drift, so long as the drift is sufficiently slow.

The embedology data/signal may be used to effect the control subsystem 130, and especially the feedback loop 150. However, the control subsystem 130 may be of any suitable design readily determined by a person of ordinary skill in the art.

For simplicity, the above-described orbit has been referred to as a period one orbit. The invention applies equally well to any periodic orbit of period one or higher or to unstable steady states. To apply control to a higher period orbit one can adjust the feedback signal F at each iterate of the map, or only once, and then let the orbit cycle through all its values before readjusting the feedback signal again, depending on the time series developed in the embedology step.

Consider, for example, an unstable orbit of period k, so that the orbit cycles through the following k points: $X_1, X_2, \ldots, X_k$, after which it comes back to $X_1$. In such a case, adjusting the feedback signal F as one goes from $X_n$ to $X_{n+1}$ for each n between 1 and k, requires changing Eqn. (1) to:

$$F_n = \frac{\lambda_{u,n}\vec{f}_{u,n}\vec{X}_n}{\lambda_{u,n}\vec{f}_{u,n}\vec{g}_n - \vec{f}_{u,n+1}\vec{g}_{n+1}}$$

The above equation includes the same vectors as in Eqn. (1) and the additional vectors $\vec{f}_{u,n+1}$ and $\vec{g}_{u,n+1}$; these vectors have the same meaning for the point on the orbit $X_{n+1}$ as $\vec{f}_{u,n}$ and $\vec{g}_{u,n}$ have for the point $X_n$. More precisely, $\vec{f}_{u,n+1}$ stands for a contravariant basis vector for the linearization of the matrix of the map about the point $X_{n+1}$ and $\vec{g}_{u,n+1}$ denotes the rate of change of $X_{n+1}$ with respect to the parametric value p. This formula is the same one appearing in the OGY algorithm where $k=1$ and we incorporate it in our tracking procedure. Other forms of linear control (other than OGY) can be used and the control can be applied at each iterate of the map or just once every cycle, depending on the particular time series one is working on.

With the control procedure established, tracking the period k orbit is done identically to tracking a period one orbit.

The above discussion explains the control and tracking procedure assuming only one unstable direction exists.

The above-described tracking procedure can be implemented in higher dimensional systems having more than one unstable direction using the technique presented in Auerbach, Grebogi, Ott and Yorke, Phys. Rev. Lett, 69, 24 (1992). To correct, i.e., bring the time average of the feedback signal F to essentially zero, control is exercised about a reference point, i.e. a value of $U_{ref}$, and $U_{ref}$ is adjusted to bring the time average of the feedback signal F to essentially zero. The control procedure about the reference point, i.e., $U_{ref}$, is now the one suitable for high-dimensional systems with more than one unstable direction.

Several specific applications of the invention as described above in general terms will now be discussed.

EXAMPLE 1

Multimode Laser System

Figure 6:
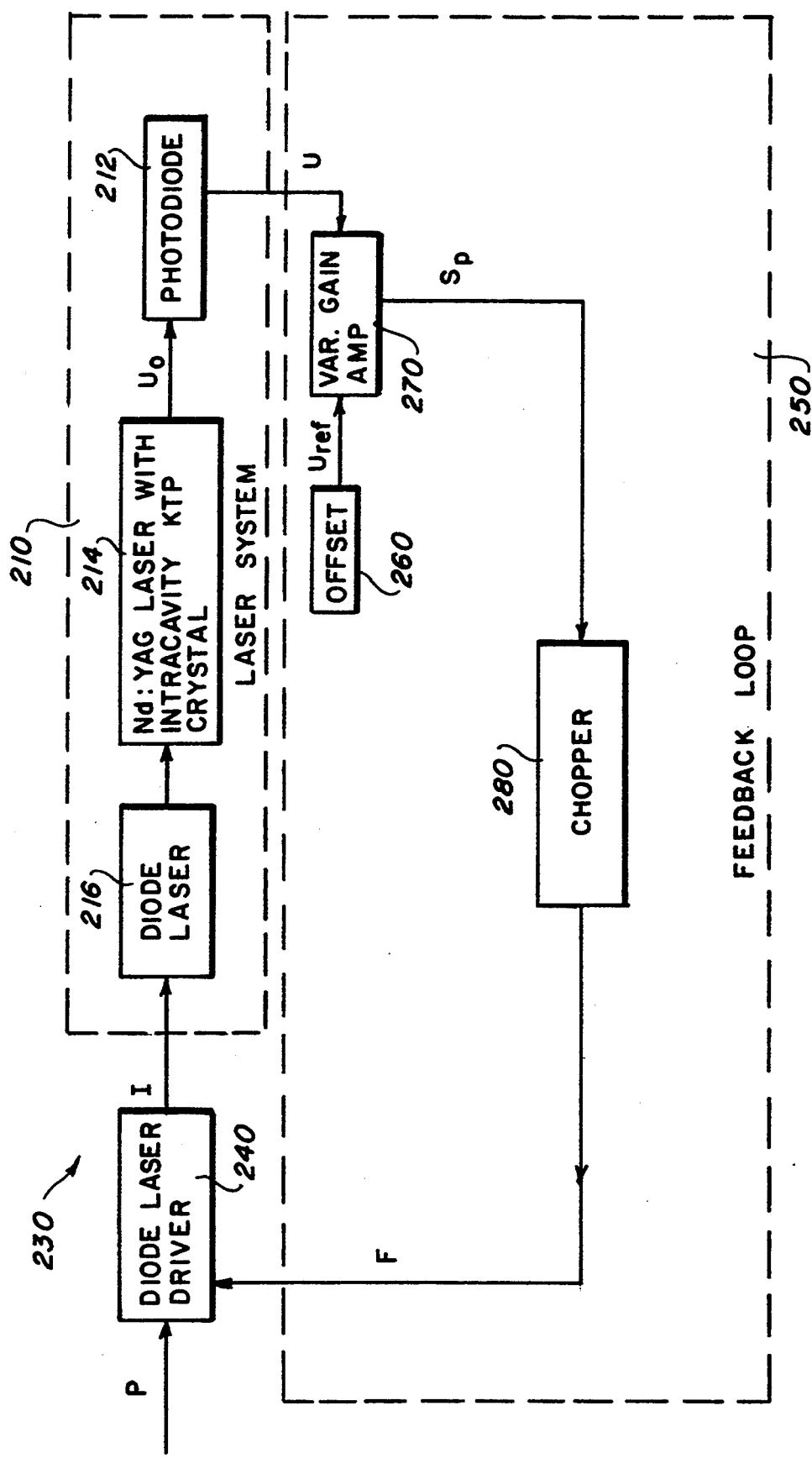
FIG. 6 shows a control subsystem for stabilizing a laser system.

Referring now to FIG. 6, an analog feedback control subsystem for stabilization of a laser system 210 with respect to pump power p is shown. An electrical parametric signal P, determinative of the pump power p, is applied to the diode laser driver 240, which combines the signal P with an electrical feedback signal F to produce an electrical input signal I for input to the laser system 210. The parametric signal P is a dc bias, and the feedback signal F is a control signal. The laser system 210, responsive to the input signal I, produces an optical signal $U_o$ at 1.06 micrometers (μm), which is detected by a photodiode 212 to produce an electrical output signal U. A feedback loop 250, responsive to the output signal U, produces the feedback signal F which, as discussed earlier, is applied to the driver 240. This application to laser systems is discussed more fully in Gills, Iwata, Roy, Schwartz and Triandaf, "Tracking Unstable Steady States: Extending the Stability Regime of a Multimode Laser System," Phys. Rev. Lett. 69, 3169 (1992), which article is incorporated herein by reference. A related control system is discussed in Roy, Murphy, Maier and Gills, "Dynamical Control of a Chaotic Laser: Experimental Stabilization of a Globally Coupled System," Phys. Rev. Lett. 68, 1259 (1992), which article is also incorporated herein by reference.

Figure 7:
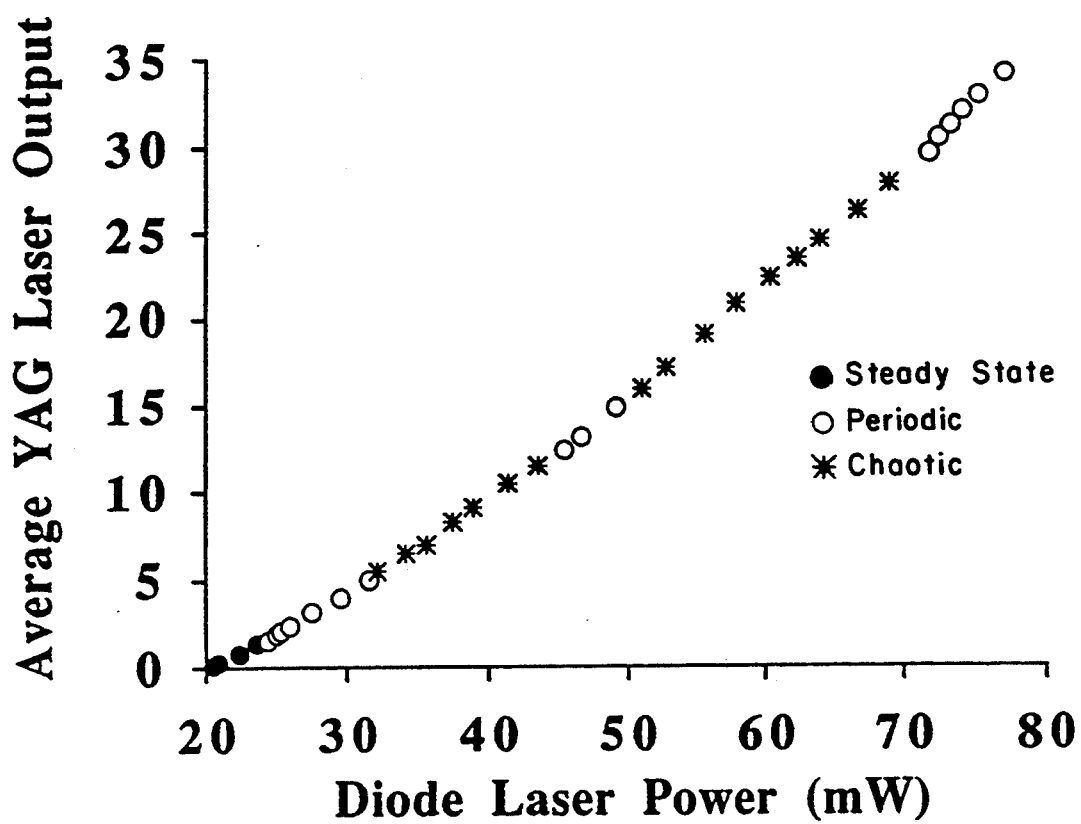
FIG. 7 shows the behavior of an uncontrolled laser over a pump power range.

Specifically, the laser system 210 includes a Nd:YAG (neodymium doped yttrium aluminum garnet) laser 214 with a nonlinear intercavity KTP (potassium titanyl phosphate) crystal. The laser 214 is pumped with a diode laser 216. This laser system 210 is characterized as a high dimensional system, which displays steady state periodic and chaotic fluctuations of the output intensity for certain operating regimes of pump power. As shown in FIG. 7, for uncontrolled operation, this laser exhibits steady state, periodic and chaotic behavior over the pump power range 20 milliwatts (mW) to 75 mW, with steady state behavior occurring only near the lower end of this range, below about 25 mW.

Referring back to FIG. 6, the feedback loop 250 of the control subsystem 230 includes device 260 for producing an offset signal $U_{ref}$. An amplifier 270 amplifies the difference between the output signal U and the offset signal $U_{ref}$ by a gain factor G to produce a perturbation signal $S_p$.

Using standard electronics, a chopper 280 samples the perturbation signal $S_p$ to produce a feedback signal F in the form of a pulse, with short pulse width compared to the sampling period. In other words, the feedback signal $F_n$ for the n-th iteration is a short pulse followed by a null signal, until the next pulse is produced at the n+1 iteration: it has the waveform of a series of pulses separated by null signals, the pulse duration being shorter than the duration of the null signals. The control subsystem 230 thus applies a series of minute kicks of fluctuating magnitude and sign to the diode drive parametric signal P. The control parameters of this control subsystem 230 are:

(a) the reference level $U_{ref}$ produced by device 260, with respect to which the amplifier 270 compares the intensity of the output signal U;

(b) the gain factor G by which the amplifier 270 multiplies the difference between the reference level $U_{ref}$ and the output signal U;

(c) the period T at which the output signal U is sampled; and (d) the gating period δt over which the correction according to $F=G\cdot(U-U_{ref})$ (eqn. (2)) is applied to the ambient value p of the parametric signal P.

The control subsystem 230 further includes means for adjusting the parameters $U_{ref}$, G, T, and δt so that after an adjustment period, the time average of the feedback signal becomes essentially zero.

Figure 8A:
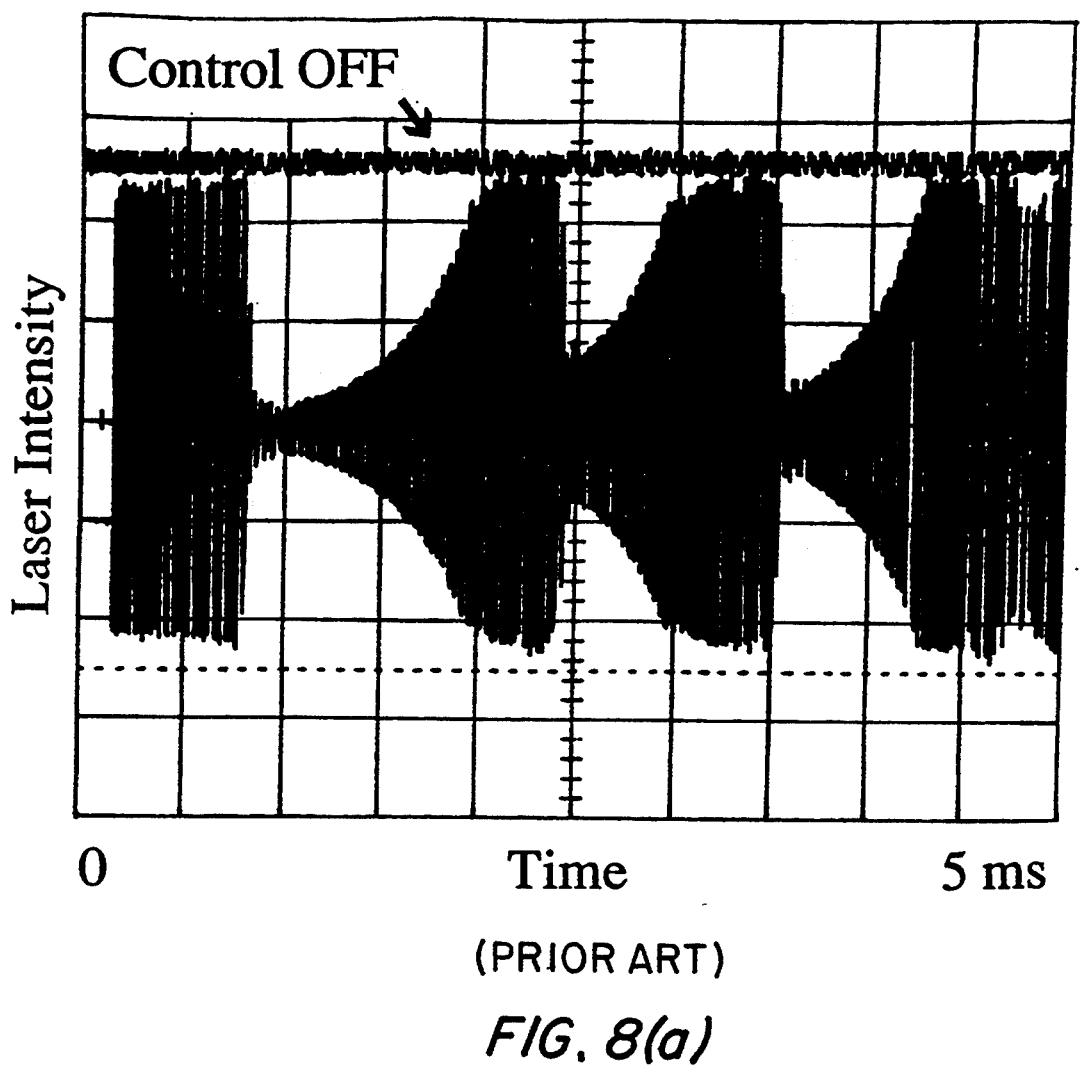
FIGS. 8(a) and (b) show oscilloscope tracings of a laser.
Figure 8B:
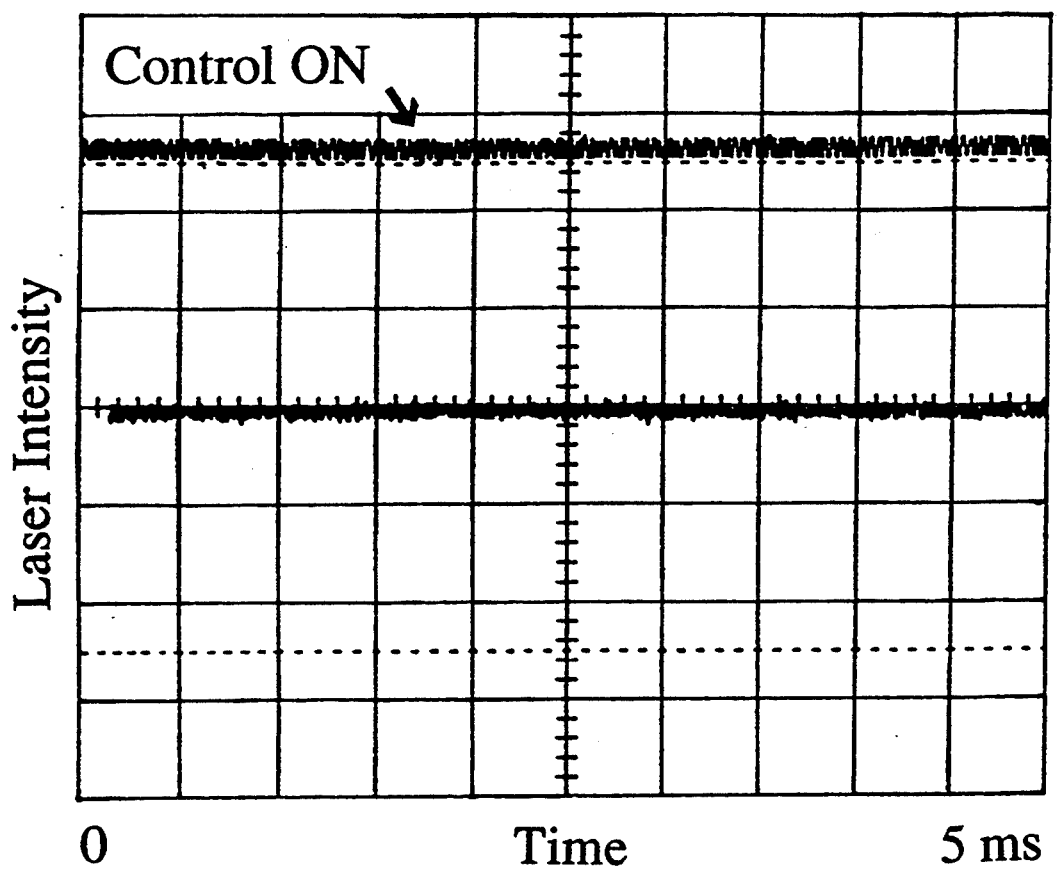

Referring now to FIG. 8, an oscilloscope trace of the laser system 210 of FIG. 6, when driven at 53 mW, is shown. FIG. 8(a) shows the laser intensity (of signal U) when the control subsystem 230 is turned off, i.e., when the feedback signal F is null. FIG. 8(b) shows the laser intensity (of signal U) when the control subsystem 230 is turned on, that is, when the parameters $U_{ref}$, G, T, and δt discussed above are adjusted for optimal control producing feedback signal F whose time average becomes zero. On each trace in FIGS. 8(a) and 8(b), the bottom trace is the trace of the laser intensity. It can be seen that the control subsystem 230 has stabilized an unstable laser system 210. In FIG. 8(a), the top trace is noise; in FIG. 8(b), the top trace is the feedback signal F. It can be seen that the feedback signal F is of the same magnitude as noise and is not zero.

The control subsystem 230 of FIG. 6 is used to track the laser system 210 over the 30 mW–75 mW range of pump power p for parametric signal P. In particular, the control system 100 (FIG. 2) tracks the laser system 210 on steady state.

Referring back to FIG. 5, the tracking procedure starts with step $S_2$: selecting the steady state orbit. Step $S_3$ is then performed: the parametric signal P is set at an initial value p of about 25 mW. The precise initial value of the parametric signal P is not critical, so long as the laser system 210 operates in steady state at that initial value. Step $S_4$, application of the parametric signal S to the control subsystem 130 is then performed. Since the laser system 210 is in steady state, control can be left off—i.e., the feedback signal F is null. Steps $S_5$, steady increasing of the pump power p in small steps of about 1–3 mW, and $S_4$, application of the parametric signal P to the control subsystem 230, are then performed. The output signal U is monitored. So long as the laser system 210 remains in steady state, as determined by evaluating output signal U, control can be left off. When unstable oscillations of the intensity of output signal U are detected, control is turned on, bringing the system back to steady state. When control is on, the parameters $U_{ref}$, G, T and $\delta t$ are adjusted to minimize the time average of the feedback signal F. When the time average of the feedback signal F becomes essentially zero, the pump power p is increased by another small increment, and the process of adjusting the parameters until the time average of the feedback signal F becomes essentially zero is repeated (step $S_6$). By repetition of these procedures, the laser 210 is tracked up to about 75 mW, remaining in steady state for at least several minutes at each pump power value. As an alternative to the above-described procedure with equally effective results, the control subsystem 210 is turned on (nonzero feedback signal F) from the inception of this procedure.

Figure 9:
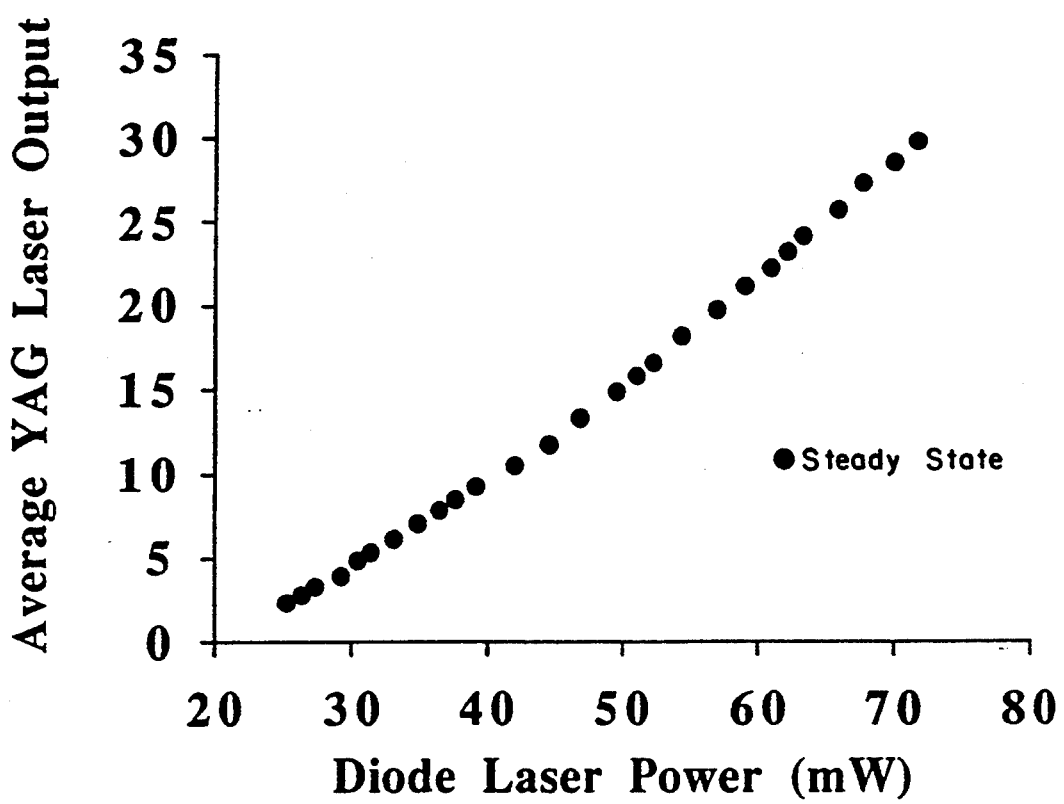
FIG. 9 shows the behavior of a laser system under tracking control.

Referring now to FIG. 9, the results of the above-described tracking procedure are shown. Upon application of the control system 100 to the laser system 210, steady state has been obtained over a range considerably greater than that shown in FIG. 7.

Figure 10:
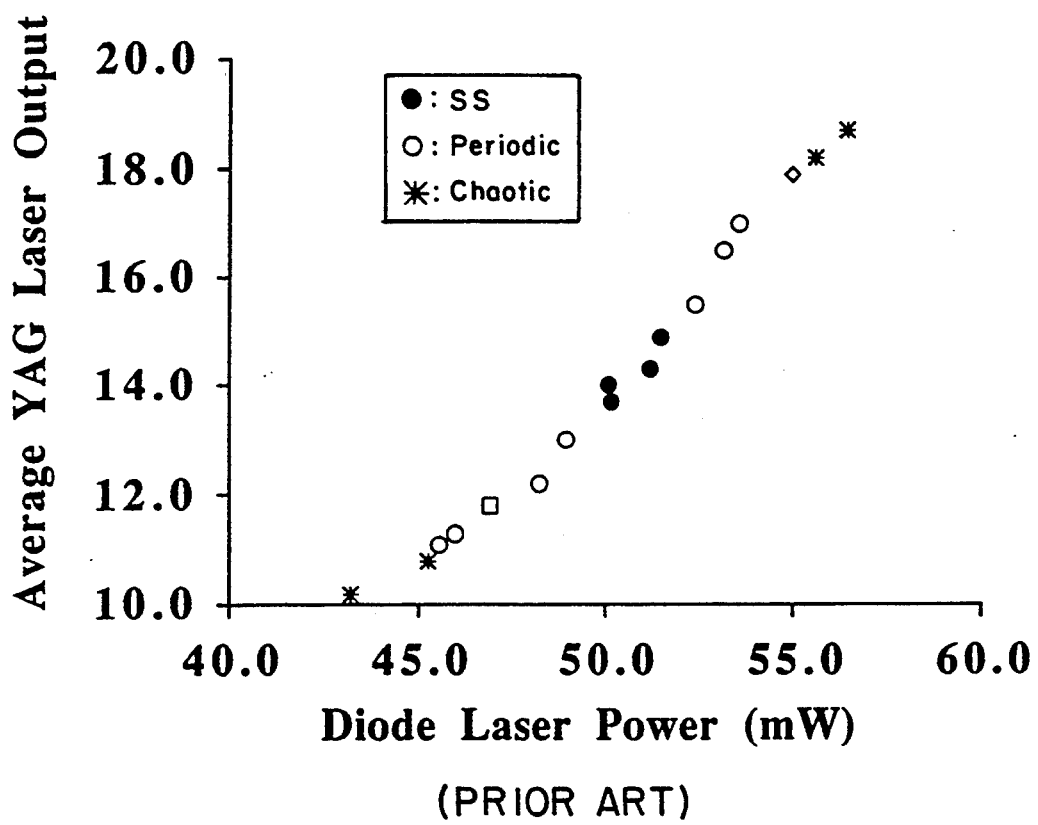
FIG. 10 shows the behavior of a laser system under control without tracking.

The tracking and control system 100 of the present invention is compared with a control system that does not correct, that is, one for which the time average of the feedback signal F is not brought to essentially zero. An example of such a control system is one in which the parameters $U_{ref}$, G, T and $\delta t$ are held constant. The results of such a control system applied to the laser 210 are shown in FIG. 10. For such a control system, control is not feasible at many values of the pump power in the 30 mW to 75 mW range of interest. Even for those accessible parametric values, such as 53 mW, at which control is achieved, stabilization at nearby points is not feasible. Stabilization is lost for small changes in pump power about those accessible values. As the pump power p is changed by small amounts without changing the parameters $U_{ref}$, G, T and $\delta t$, the laser will go from steady state to high period orbits and chaos, and the parametric fluctuations F needed to control the laser system will become very large—outside of the window discussed earlier. This shortcoming is due to the failure to correct, that is, to adjust to the changed orbit or fixed point about which the system is controlled as the parameter is changed. In contrast, as shown in FIG. 9, the control system 100 of the present invention for tracking the laser system 210 provides for control on selected steady states at previously inaccessible parametric values.

The above-described system 100 and 230 for controlling a laser system, and equivalents thereof is equally applicable to control of other types of lasers, laser systems, coupled lasers, and nonlinear optical devices. In addition, the above-described general system 100 including, for example, continuous variation of the parameter p, the embedding step $S_1$, and nonlinear feedback loops, is equally applicable to tracking and controlling lasers and laser systems.

EXAMPLE 2

Electronic Circuit

Figure 11:
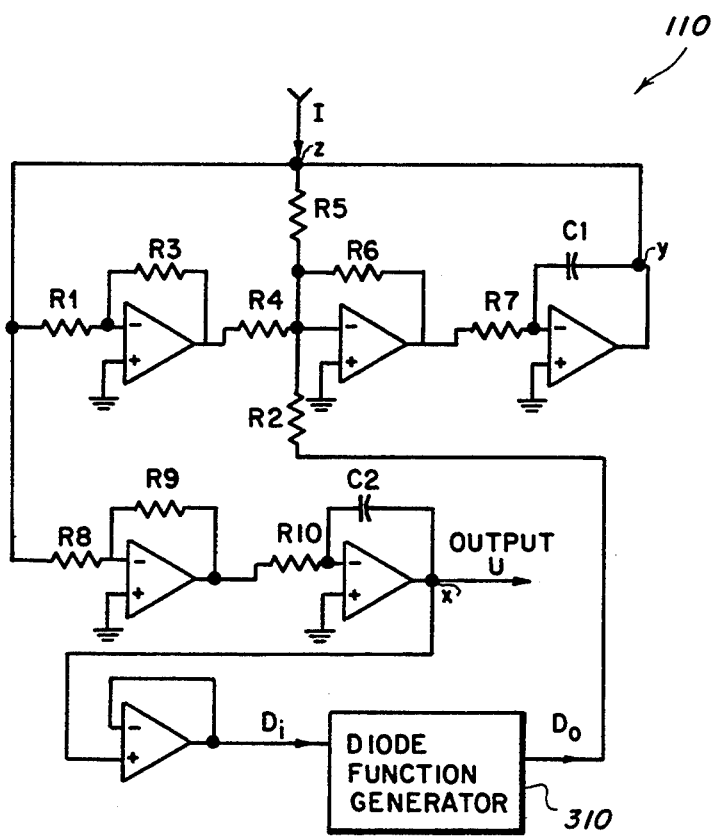
FIG. 11 is a schematic of an electronic Duffing circuit.
Figure 12:
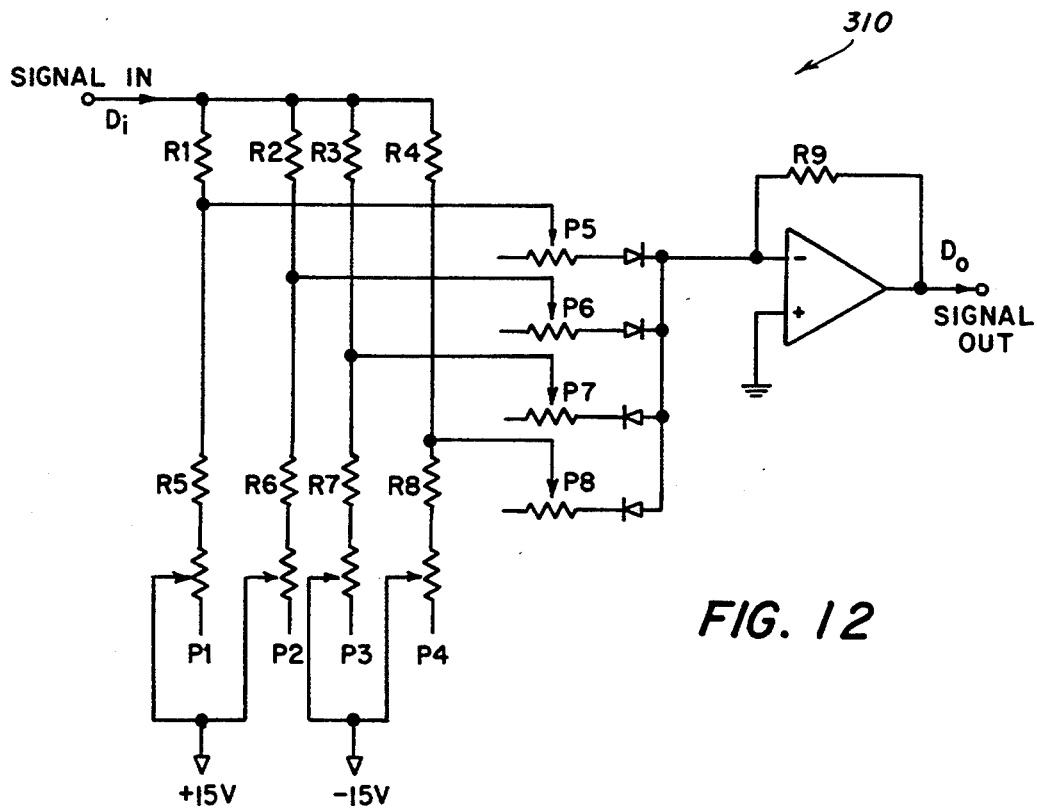
FIG. 12 is a schematic of the diode function circuit of FIG. 11.

Referring now to FIG. 11, a Duffing circuit 110 is shown, which Duffing circuit 110 responsive to input signal I for producing an output signal U, is to be controlled. The component values of the Duffing circuit 110 are R1=R3=R4=R5=R6=10 kOhm, R2=39.2 kOhm, R7=100 kOhm, R8=R9=1 MOhm, C1=C2=0.001 μFarad. All op amps are type 741. The Diode function generator 310 of the Duffing circuit 110 approximates the response $D_o = D_i^3$. Referring now to FIG. 12, the Diode function generator is shown in further detail. The component values of the Diode function generator 310 are R1=R2=R3=R4=R9=100 kOhm, R5=R7=680 kOhm, R6=R8=2 MOhm, P1=P2=20 kOhm potentiometer, P2=P4=50 kOhm potentiometer, P5=P6=P7=P8=20 kOhm potentiometer in parallel with a 100 Ohm resistor. The diodes are all type 1N485B. The potentiometers are used to match different $x^3$ circuits to each other. The amplifier is type 741.

The Duffing circuit 110 of FIGS. 11 and 12 is modeled by the equations $$\frac{dy}{dt} = \alpha \cdot (z - 0.2y - G(x)) \tag{3}$$

and $$\frac{dx}{dy} = \alpha y, \tag{4}$$

where y is the voltage of the node as shown, x is the voltage of the output signal U, z is the voltage of the input signal I, $\alpha$ is the time factor $1*10^4 \text{s}^{-1}$, and G(x) is the response of the diode function generator, specifically, $$G(x) = \begin{array}{ll} 0 & \text{if } |x| < 1.2; \quad (5a) \\ x - 1.2 \cdot \text{sgn}(x) & \text{if } 1.2 \leq |x| < 2.6; \text{ and} \quad (5b) \\ 2x - 3.8 \cdot \text{sgn}(x) & \text{if } 2.6 \leq |x|, \quad (5c) \end{array}$$

where sgn(x)=−1 if x<0, sgn(x)=+1 if 0<x, and sgn(x)=0 if x=0. As will be discussed further below, the input signal I is an amplitude modulated signal. The carrier signal has voltage of the form $z_c = p \cdot \cos(\omega t) + 0.3$ V, where $2\pi\omega = 726$ Hz, and p is the parametric value about which control and tracking is desired. The Duffing circuit 110 just described is a nonlinear system 110 responsive to input signal I for producing an output signal U.

This Duffing circuit 110 is selected as an example to show the use of the above-described control system 100 for tracking electronic circuits in general, and in particular, an electronic circuit which is particularly difficult to control. A Duffing system described by Eqns. (3–5) is known to have chaotic, unstable and stable regimes, and to exhibit bifurcations. For example, while operating the Duffing system described by Eqns. (3–5) at a particular parametric value, the output signal U might flip between different values of x with very small changes in the input signal I or other parameters, including parameters of device components such as resistors, capacitors and op amps. Such a system is made even more difficult in practice in the Duffing circuit of FIGS. 11 and 12 by using inexpensive and noisy op amps and low precision resistors, potentiometers, capacitors, and function generators. This example thus demonstrates broad applicability of the above-described control system for tracking electronic systems in general.

Step $S_1$ (FIG. 5) is performed as determining the characteristics of the Duffing circuit 110 by producing a time series based on a Poincaré section. Specifically, the Duffing circuit 110 is run without control for the parameter value p=7.4 Volts. The output signal U is sampled as the voltage z of the input signal I crosses zero going from negative to positive, resulting in the time series $U_1, U_2, \ldots$. A two dimensional return map is prepared by plotting $U_n$ with $U_{n+1}$, that is, $(U_1, U_2)$, $(U_2, U_3)$, $(U_3, U_4)$, .... A one-dimensional fixed point shows up on such a return map as being on a 45° line drawn through the origin. Step $S_2$ (FIG. 5) is performed as well known embedding techniques are used to find the unstable period one fixed point of interest using the return map. In addition, these embedding techniques using the return map are used to determine the Duffing control parameter factors described below for keeping the Duffing circuit on the unstable period one fixed point of interest.

As an alternative to the embedding technique (step $S_1$), periodic fixed points of interest could be determined by scanning through possible Duffing control parameter factors, described below.

Figure 13:
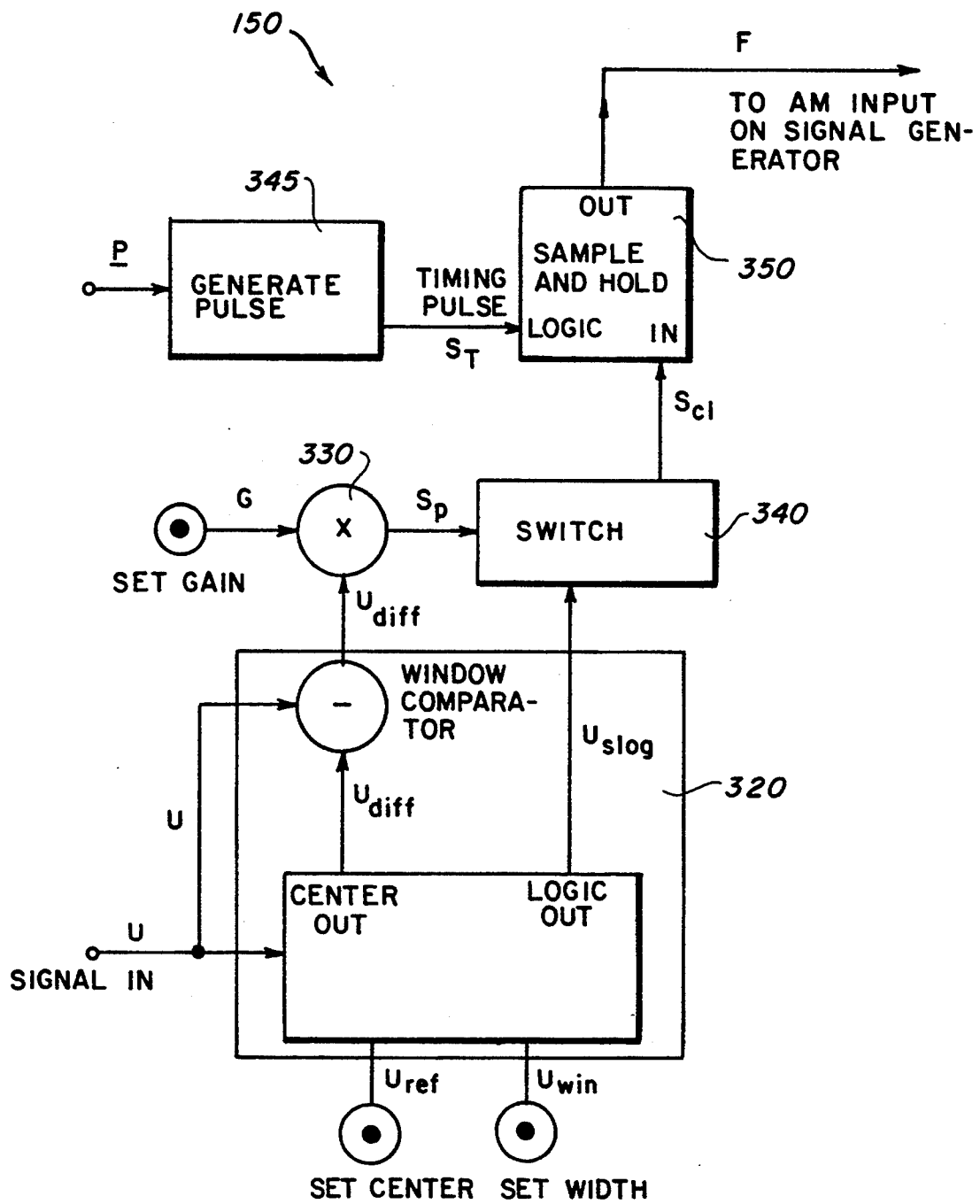
FIG. 13 is a feedback loop used in control of the Duffing circuit of FIG. 11.

A feedback loop (FIG. 2) of a control subsystem 130 (FIGS. 1 and 2) for controlling the Duffing circuit 110 (FIGS. 1, 2, 11) is shown in FIG. 13. Turning now to FIG. 13, the feedback loop 150, responsive to input signal U, produces a feedback signal F of voltage $f_m$. The modulator 140 (FIG. 2), responsive to a parametric signal P with value p, produces a carrier signal (not shown) with voltage $$z_c = p \cdot \cos(\omega t) + 0.3 \text{ V}, \qquad (6)$$

where $2\pi\omega = 726$ Hz, and performs amplitude modulation on the carrier signal with the feedback signal F of voltage $f_m$ to produce the input signal I (FIGS. 2, 11).

A window comparator 320 in the feedback loop 150, responsive to the input signal U, a center parameter $U_{ref}$, and a width parameter $U_{win}$, produces a difference signal $U_{dif} = U - U_{ref}$ and a logical window signal $U_{slog}$. If the magnitude of $U_{dif}$ is less than or equal to the width parameter $U_{win}$, then the window signal $U_{slog}$ is +5 V. If the magnitude of $U_{dif}$ is greater than the width parameter $U_{win}$, then the window signal $U_{slog}$ is 0. A multiplier 330 multiplies the difference signal $U_{dif}$ by a gain factor G to produce a perturbation signal $S_p$. A switch 340 responsive to the perturbation signal $S_p$ and the window signal $S_{slog}$ produces a clipped perturbation signal $S_{cl}$ of value $S_p$ if the window signal $S_{slog}$ is +5. V, and value 0. if the window signal $S_{slog}$ is 0. A pulse generator 345 responsive to the parametric signal P (or, alternatively, to the input signal I), produces a timing pulse $S_T$ with frequency $2\pi\omega = 726$ Hz and pulse-width of about 1 μs. A sample and hold device 350 responsive to the clipped perturbation signal $S_{cl}$ and to a 5 Volt timing pulse signal $S_T$ produces the feedback signal F. In other words, if the timing pulse $S_T$ is on, the feedback signal F is the value of the clipped perturbation signal $S_{cl}$. If the timing pulse $S_T$ is off, the feedback signal F is held at the value set when the timing pulse $S_T$ was last on.

The Duffing control parameter factors for the feedback loop 150 just described are the center parameter $U_{ref}$, the width parameter $U_{win}$, the gain factor G, and the characteristics of the timing pulse signal $S_T$. In practice, all of the Duffing control parameter factors except for the center parameter $U_{ref}$ are set before tracking the Duffing circuit 110. A feedback loop 150 (FIGS. 2, 4) including a feedback producer 160 (FIG. 4) and a feedback adjustor 170 (FIG. 4) is readily designed to adjust the center parameter $U_{ref}$ until the time average of the feedback signal F over a selected period of time, say, 100 periods of the timing pulse $S_T$, becomes essentially zero.

The above-described control subsystem 130 (FIG. 2), including the feedback loop 150 of FIG. 13 and the modulator 140, is used in a control system 100 (FIG. 1) to track the Duffing circuit 110 (FIGS. 2, 11, 12) as the amplitude p (Eqn. 6) is varied.

Referring now to FIG. 5, the performance of step $S_1$ is performed as described above, using the Poincaré section. An unstable period one fixed point is identified (step $S_2$). The amplitude p is set to an initial value (step $S_3$) corresponding to the selected unstable period one fixed point. This initial parametric value is in the chaotic regime, and the Duffing circuit 110 is capable of operating on one of several fixed points. As an example, the initial parametric value is set at p=7.4 Volts. The parametric signal P with initial parametric value is applied to the above described control subsystem 130 (step $S_4$), and the center parameter $U_{ref}$ is adjusted until the time average of the feedback signal F over a selected period, say 100 periods of the timing pulse $S_T$, becomes essentially zero. For an initial parametric value p of 7.4 V, the center parameter $U_{ref}$ becomes 0.493 V. The parametric value p is then varied, say, to p=7.1 V (step $S_5$), and applied to the control subsystem 130 (step $S_4$) with the center parameter $U_{ref}$ left at the same value, in this case, $U_{ref} = 0.493$ V. The center parameter is then adjusted until the feedback signal F time average becomes essentially zero. For this case (p=7.1 V), the center parameter $U_{ref}$ becomes 0.523 V. The process is then repeated (step $S_6$) to track the Duffing circuit 110 over a desired range, which may include values for which the circuit 110 operates in the chaotic and the nonchaotic regimes.

In this fashion operation of the Duffing circuit 110 is tracked from the known chaotic regime down through the known period doubling cascade to the known period doubling point, where the period one orbit is stable, and control is maintained throughout. In other words, operation of the Duffing circuit 110 is stable for all applied parametric values p.

A feature of the Duffing circuit 110 which facilitates the above described tracking and control is that the center parameter $U_{ref}$ is monotonically related to the parametric value p. A simple linear feedback loop 150 as shown in FIG. 13 is adequate for use in a system 100 to control and track the Duffing circuit 100. More complex nonlinear electronic circuits may be readily stabilized and tracked by application of the above-described techniques, although it might be necessary to use more complicated designs than the linear feedback loop 150 just described.

EXAMPLE 3

Henon Map

The above-described control system for tracking is applied to a nonlinear system following the Henon map, which is given by the equations:

$$x_{n+1} = 1.29 + p - x_n^2 + By_n \text{ and } y_{n+1} = x_n.$$

For $p<0.11$, this Henon system has a chaotic map containing an unstable period one (fixed point) orbit. Nevertheless, this Henon system can be tracked and controlled as described above, using p as the parametric value of the parametric signal P, and $x_n$ as the value of the output signal, for the range $0.<p<2.5$.

EXAMPLE 4

Chemical Systems

One of the main problems in chemical engineering is that of finding stable operating regimes-of chemical flow reactors. In these experimental and industrial Setups, new materials such as polymers are made. Maximizing the rate at which these materials are constructed implies that the reactors must operate at a faster flow rate. However, faster flow rate also mean the onset of instabilities which lead to chaotic oscillations. When operating chaotically, the reactors are much less efficient in producing new materials. Here we show for a generic reaction how the new tracking procedure may be implemented to stabilize unstable periodic solutions from a time series alone.

The model we consider is a prototype model which exhibits asymptotic chaos under isothermal, open conditions.

The scheme consists in six reaction steps, each with rates given by law-of-mass-action kinetics:

$$P \longrightarrow A, \text{ rate} = k_0 \alpha_0$$

$$P + C \longrightarrow A + C, \text{ rate} = k_c p_0 c$$

$$A \longrightarrow B, \text{ rate} = k_u a$$

$$A + 2B \longrightarrow 3B, \text{ rate} = k_1 ab^2$$

$$B \longrightarrow C, \text{ rate} = k_2 b$$

$$C \longrightarrow D, \text{ rate} = k_3 c,$$

where the concentration of the precursor reactant P is treated as a constant $p_0$, for the open system considered here.

The rate equations for the above scheme can be written in a convenient dimensionless form:

$$\frac{d\alpha}{d\tau} = \mu(k + \gamma) - \alpha - \alpha\beta^2 \quad (7)$$

$$\sigma \frac{d\beta}{d\tau} = \alpha + \alpha\beta^2 - \beta$$

$$\delta \frac{d\gamma}{d\tau} = \beta - \gamma,$$

where $$\alpha = \sqrt{\frac{k_1 k_u}{k_2^2}} \cdot a,$$

$$\beta = \sqrt{\frac{k_1}{k_u}} \cdot b,$$

$$\gamma = \sqrt{\frac{k_1 k_3^2}{k_u k_2^2}} \cdot c$$

are dimensionless concentrations, $$\tau = k_u \cdot t$$

is dimensionless time, and $$\mu = \left(\frac{k_c}{k_3}\right) p_0,$$

$$k = \left(\frac{k_0 k_3}{k_c k_2}\right) \sqrt{\frac{k_1}{k_u}},$$

$$\tau = \frac{k_u}{k_2},$$

$$\delta = \frac{k_u}{k_3}$$

are dimensionless parameters.

We will use the parameter $\mu$, which is the flow rate, as the controlling parameter p. The modulator 140 of this control subsystem will adjust the flow rate. The species $\beta$ will be measured by an ionic probe in the experiment. This will be our time series.

Time delay embedding is performed. The flow of Eqn. (7) is discretized by first considering a plane of intersection to reduce the dynamics to a next return map.

For this system, the next return map is evaluated to identify the period 1 fixed point of interest, which occurs where the map intersects the 1:1 line. For three small changes in parameters, each corresponding period 1 fixed point changes in location by a small amount.

The control is now implemented by first locating an approximate fixed point of period 1, and then adjusting the gain based on the OGY algorithm for 1 dimensional systems.

In each case of control, we have small amplitude fluctuations about some constant level of parameter, $\mu$. In addition, we have specified the location of the control reference point from the 1 dimensional discrete map representation based on the time series of $\beta$. To perform the tracking in such an experiment, one first controls the periodic orbit in question as described above. Next, one increases the parameter value of $\mu$, which induces an error in the control. This error is measured experimentally by examining the mean value of the fluctuations about the current constant value of $\mu$. To reduce the error, the control reference point is adjusted so that the mean value of the fluctuating part is minimized.

Tracking can be further implemented by again increasing the constant part of the flow rate, and repeating the above error correction procedure.

EXAMPLE 5

Excitable Cell Membranes

The algorithm we propose applies to a large class of biological systems, namely to models that explain the transport mechanism across an electrically excitable cell membrane. When coupling these cells together, they form what is known in biology as excitable media. Such systems account for ionic fluxes and permeability changes across the excitable membrane in terms of molecular mechanisms.

The flux of ions across the membrane is accomplished through the so-called ionic channels. These are macromolecular pores in the cell membrane which are sensitive to electrical or chemical signals. An ionic channel is an excitable macromolecule which has the property of opening or closing a pore in the membrane as a response to a stimulus which can be electrical or chemical. This property is known as 'gating'. Moreover the opening and closing of the pore is selective to certain types of ions, a property known as the 'selective permeability' of the membrane. The $Na^+$, $K^+$, $Ca^{2+}$ and $Cl^-$ ions seem to be responsible for almost all of the action.

Ionic channels are found in the membrane of all cells and their functions include establishing a resting membrane potential, shaping electrical signals and gating the flow of ions through the membrane.

The classical model describing ionic channels is the Hodgkin-Huxley model which is the prototype for the class of models to which our method applies. This is a model for the giant squid axon and the ideas of this model were extended to cells which can make action potentials, that is membrane potential changes caused by the flow of ions through ionic channels in the membrane. Cells that can make action potentials can always be stimulated by an electric shock, making them electrically excitable. During electrical activity the membrane permeability (conductance) is changed.

The aim of our control procedure is to be able to maintain the activity across the cell membrane at a given level, by controlling the amplitude of an externally applied electric stimulus. This is especially desirable in heart cells where changes in the voltage across the membrane are believed-to be the origin of cardiac arrhythmias. The amplitude of the externally applied stimulus is thus our control parameter p.

By suitably changing this parameter p we are able to maintain the voltage across the membrane at a desired level. This has as an immediate consequence keeping all the ionic fluxes through the membrane on a fixed, controlled level, since all of these quantities oscillate in phase.

Our method addresses a large class of models which derive from the Hodgkin-Huxley model. These models are based on observations of the ionic movements and permeability changes of the membrane and the fundamental rules for constructing such a model are at the level of electricity and kinetic theory. Biophysicists thus represent dynamic processes as equations of chemical kinetics and diffusion, membranes as electric circuits and molecules as charges, dipoles and dielectrics. Our model obeys rules of thermodynamics and electrostatics, give responses like those observed and suggest some structural features of the processes described. The biophysical method fosters sensitive and extensive electrical measurements and leads to detailed kinetic descriptions, contained in the models we are addressing.

The model we will focus our attention on is a heart cell model and apply our method to control the voltage across the membrane of a heart cell, by suitably modifying the amplitude of an externally applied electric stimulus. The controlled state is then maintained stable as the amplitude of the stimulus is increased, a procedure that we refer to as tracking and which is the main novelty of our procedure. In the model, all ionic currents oscillate in phase, so that although the procedure is applied only to the voltage, all ionic currents are stabilized as a consequence.

The model we consider describes the influence of brief duration current pulses on the spontaneous electrical activity of embryonic chick atrial heart cell aggregates.

The model contains several ordinary differential equations. The voltage V across the cell membrane satisfies the equation:

$$\frac{dV}{dt} = \frac{(I_{ionic} + I_{stim})}{C_i}.$$

From this equation we see that the total membrane current is due to the current $I_{ionic}$ carried by ions crossing the membrane and current $I_{stim}$ which is externally applied. The membrane behaves with respect to this external stimulus as a capacitor; ions move up to the membrane to charge or discharge its electrical capacity. $C_i$ represents the capacitance of the membrane.

In an experiment one can measure the voltage across the membrane. This is done with glass micropipette electrodes which are made from capillary tubing pulled to a fine point and filled with a concentrated salt solution.

In this model the ionic currents $I_{Na}, I_K, I_{x1}$ and $I_{Ca}$ are given by the following formulas:

$$I_{Na} = 90\ m^3(t)h(t)(V-40)$$

$$I_K = I^{K0}n(t)$$

$$I_{x1} = I_0 s_{x1}$$

$$I_{Ca} = 20\ d(t)f(t)f'(t)(V-30).$$

In addition to these, there is also o background current $I_b$, with components $I_b1, I_b2$ and $I_b3$ which are given by functions of the voltage V involving exponential terms.

To determine these ionic currents one determines the gating variables $m, h, n, s_{x1}$, d, f and f' from a system of ordinary differential equations. These gating variables are dimensionless quantities that represent the time dependent opening and closing of the ionic channels with respect to different substances, like sodium, potassium and calcium as well as a gate variable $s_{x1}$ which takes into account the repolarization current. These gate variables modify thus the conductance of the membrane with respect to different substances.

Each of the gating variables satisfies an equation of the form $$\frac{dg}{dt} = -(\alpha(V) + \beta(V))g(t) + \alpha(V),$$

where g denotes a generic gating variable and $\alpha$ and $\beta$ are functions of the voltage V.

In addition to these differential equations the system contains one more equation describing the internal calcium ion concentration. This equation reads as follows:

$$\frac{d(Ca_i)}{dt} = -13 \times 10^{-6} I_{Ca} + 80(10^{-7} - Ca_i).$$

In an experiment, the control procedure applies to the voltage only and involves the following the following steps:

1) Locating a desirable state of the system. This state may be known to exist empirically or the equations may have to be used.

Another way to locate the state to be controlled would be to find a stable state and track that state until it becomes unstable and control becomes necessary. Let us assume that this state corresponds to a value of the amplitude $A_0$.

2) Once we have the state to control we use it as our reference state for control. The control itself consists in changing the amplitude of the electrical stimulus, slightly around the fixed value $A_0$, proportionally to the distance between the current state of the voltage and the reference state. This has the result of maintaining the system on the desired state as the system evolves in time.

The change in the parameter is performed at certain stages in the time series. For example, we can interfere with our control every time the voltage goes through a peak value.

The proportionality constant involves the derivative of the state to be controlled with respect to the amplitude of the stimulus. This constant can be obtained from measurements. Control alone is enough to eliminate aperiodic solutions or even aperiodic transients which are very long for this system. These aperiodic transients are believed to produce cardiac arrhythmias, and this type of control may be used to prevent them. We remark that at this step the real time series is used. This accounts for greater accuracy than using the approximation of the time series by a model; moreover a model which captures the behavior of the system to a satisfactory degree may not be known.

From a controlled state we can move to other states by implementing the next step of our procedure, which is tracking.

3) Suppose a controlled state is achieved. We can increase the amplitude of the electrical stimulus to $A_0 + h$ and still want to be able to control. Alternately, drift in the amplitude of the stimulus may occur due to experimental conditions. In such a case in order to recover control we proceed as follows:

a) We control about the previous reference state, that is, the state corresponding to $A_0$. As we control we will notice that the mean in the fluctuations of the amplitude has shifted. That indicates an error in the reference point is present.

b) We correct this error by changing the reference point until we minimize the mean in the fluctuations of the parameter, and bring it as close to $A_0 + h$ as possible.

The parameter $A_0 + h$ is then further increased to $A_0 + 2h$ and step 3 is then repeated. The region over which control holds is thus extended, step by step, at least one order of magnitude compared to the case where only control alone would be used.

We tested numerically this procedure. The system of ordinary differential equations described above was used to generate a time series. We applied our control and tracking procedure to this time series and we present the results below.

In a first test we fixed the amplitude of the external stimulus as 15.5 nA, the duration 0.01 ms, and applied with a period of 0.21 ms. We observed the corresponding time series. Long aperiodic transients were observed. In the time series, the high peaks occur regularly. In between the high peaks however, the lower peaks occur aperiodically in time. Also the amplitude of these lower peaks doesn't follow a regular pattern. They appear to drift through a range of values.

In order to control, we sample the time series for voltage at times where the voltage goes through a maximum value, i.e., at the peaks described above. Other ways of interfering in the flow can be imagined. In this way a map is generated. When control is applied to this map the transients are eliminated and the system is sustained on a period two orbit.

Next we test the tracking procedure. First we run our code without any control and obtain a the time series this way. We allowed the amplitude of the stimulus to decrease from 15.4 nA to 14.0 nA and recorded the first 100 iterates of the map, i.e. the first 600 peaks of the voltage as this amplitude was varied. We notice that the lower amplitude peaks in the voltage occur without a regular pattern. We notice that this time the system was stabilized on a period two orbit over a wide range of the amplitude. In the above numerical experiments, measurement noise was simulated by introducing an appropriate random additive term to the state variable, that is to the voltage.

This example demonstrates that the nonlinear system of an excitable cell membrane, such as heart cells, responsive to electrical stimulus, can be controlled, and that the system can be tracked with respect to electrical stimulus. Similar techniques can be used to control cardiac arrhythmia and muscle tremor using either, or both, electrical and chemical stimulus.

EXAMPLE 6

Other Systems

Structural mechanics in space: Stabilization of multimode vibrations in flexible structures is needed. By varying pivot angle, or the modulus of the material, tracking control can be achieved.

Smart materials: Smart materials are used in airplane wings which are susceptible to flutter instability. Control may be achieved by varying the electric and magnetic fields to control wing shape, and reduce the instability.

Epilepsy: Stable periodic rotating waves are a principle cause of epilepsy. External magnetic fields may be used to track the periodic wave into a region of instability, which is where the desired behavior should be.

Noise control in military platforms: Many platforms make use of gears and gimbals in their operation. By controlling angular velocity position, deterministic components of the noise may be reduced, making these platforms much quieter.

Robotics: Many robots have extendable structures which need to be stabilized as a function of angle. By adjusting a pivot as a parameter, tracking control may be achieved.

Nuclear reactor cooling: Cooling loops in reactors need to be stabilized for efficient cooling. By adjusting the temperature difference, or Reynold's number, tracking control may be achieved.

Extrusion of polymer melts: Fast flow rates of polymers cause fractal landscapes on their surfaces. Laminar, or smooth, surfaces, may be achieved at high flow rates by using tracking control to fluctuate the flow rate.

Aerodynamically unstable aircraft and spacecraft: Many fuselage and wing designs are unstable in supersonic flight. By varying the shape and structure of these designs using electric and magnetic field in the tracking control scheme, these craft can be stabilized.

It is understood that many other changes and additional modifications of the invention are possible in view of the teachings herein without departing from the scope of the invention as defined in the appended claims.

What is claimed is:

1. A system for controlling the operation of a nonlinear system, said system comprising:
   (a) means for generating a parametric signal; and
   (b) means responsive to the parametric signal for controlling the nonlinear system, said controlling means comprising:
   (i) a modulator responsive to the parametric signal and to a feedback signal for producing and applying an input signal to the nonlinear system to cause the nonlinear system to produce an output signal;
   (ii) means responsive to the output signal for producing the feedback signal;
   (iii) correcting means, operable when the time average of the feedback signal over a selected period of time is substantially nonzero, for bringing the time average of the feedback signal over the selected period of time from a substantially nonzero value to a substantially zero value; and
   (iv) maintaining means, operable when the time average of the feedback signal over the selected period of time is substantially zero, for maintaining the time average of the feedback signal over the selected period of time at a substantially zero value.

2. The system of claim 1 wherein said controlling means of paragraph (b) comprises:
   means for sampling and averaging the feedback signal over the selected period of time to produce an adjustment signal; and
   means responsive to the output signal and to the adjustment signal for producing the feedback signal.

3. The system of claim 1 comprising:
   experimental time series embedding means for generating an embedding signal; and
   means responsive to the embedding signal for producing the feedback signal.

4. The system of claim 1 wherein the nonlinear system is an electronic system.

5. The system of claim 1 wherein the nonlinear system comprises a laser system.

6. The system of claim 5 wherein said controlling means of paragraph (b) comprises means for producing a feedback signal having the waveform of a series of pulses separated by null signals, the pulse duration being shorter than the duration of the null signals.

7. The system of claim 1 wherein the nonlinear system is a chemical system.

8. The system of claim 1 wherein the nonlinear system is an excitable cell membrane.

9. The system of claim 1 wherein said controlling means of paragraph (b) comprises:
   means for producing an output reference signal having an output reference value;
   means responsive to the output reference signal for producing the feedback signal; and
   means for reducing the time average of the feedback signal over the selected period of time by adjusting the output reference value when the time average of the feedback signal over the selected period of time is substantially nonzero.

10. The system of claim 9 wherein:
    the nonlinear system operates in an operating state in phase space;
    said means for producing the output reference signal comprises means functionally dependent on the distance in phase space between the operating state and a reference orbit; and
    said controlling means of paragraph (b) comprises means for reducing the time average of the feedback signal over the selected period of time by adjusting the reference orbit when the time average of the feedback signal over the selected period of time is substantially nonzero.

11. A system for tracking the operation of a nonlinear system, said system comprising:
    (a) means for generating a parametric signal at an initial time with an initial selected value and at least one subsequent time with at least one subsequent value different from the initial value; and
    (b) means responsive to the parametric signal for controlling the nonlinear system at the initial time and at the at least one subsequent time, said controlling means comprising:
    (i) a modulator responsive to the parametric signal and to a feedback signal for producing and applying an input signal to the nonlinear system to cause the nonlinear system to produce an output signal; and
    (ii) means responsive to the output signal for producing the feedback signal having a substantially zero time average over a selected period of time.

12. The system of claim 11 comprising:
    experimental time series embedding means for generating an embedding signal;
    means responsive to the embedding signal for producing the parametric signal; and
    means responsive to the embedding signal for producing the feedback signal.

13. The system of claim 11 for tracking the operation of a nonlinear system, wherein said generating means of paragraph (a) comprises means subsequent to the initial time for varying the value of the parametric signal slowly with respect to said controlling means of paragraph (b).

14. The system of claim 13 for tracking the operation of a nonlinear system comprising:
    means for selecting an orbit for tracking; and
    means for applying the parametric signal to said controlling means of paragraph (b) so that the nonlinear system operates on the selected orbit.

15. The system of claim 14 comprising experimental time series embedding means for generating an embedding signal, wherein said orbit selection means of claim 7 and said controlling means of paragraph (b) of claim 3 are dependent on the embedding signal.

16. The system of claim 11 wherein the nonlinear system comprises a laser system.

17. The system of claim 16 wherein said controlling means of paragraph (b) comprises means for producing a feedback signal having the waveform of a series of pulses separated by null signals, the pulse duration being shorter than the duration of the null signals.

18. The system of claim 11 wherein the nonlinear system is an electronic system.

19. The system of claim 11 wherein the nonlinear system is a chemical system.

20. The system of claim 11 wherein the nonlinear system is an excitable cell membrane.

21. The system of claim 11 wherein said controlling means of paragraph (b) comprises:
   (i) correcting means, operable at the at least one subsequent time when the time average of the feedback signal over the selected period of time is substantially nonzero, for bringing the time average of the feedback signal over the selected period of time from a substantially nonzero value to a substantially zero value; and
   (ii) maintaining means, operable at the at least one subsequent time when the time average of the feedback signal over the selected period of time is substantially zero, for maintaining the time average of the feedback signal over the selected period of time at a substantially zero value.

22. A method for controlling the operation of a nonlinear system, said method comprising the steps:
   (a) generating a parametric signal; and
   (b) controlling the nonlinear system, said controlling step being responsive to the parametric signal and comprising the steps:
      (i) a modulator step responsive to the parametric signal and to a feedback signal comprising producing and applying an input signal to the nonlinear system to cause the nonlinear system to produce an output signal;
      (ii) producing the feedback signal, said producing step being responsive to the output signal;
      (iii) a correcting step, operable when the time average of the feedback signal over a selected period of time is substantially nonzero, comprising bringing the time average of the feedback signal over the selected period of time from a substantially nonzero value to a substantially zero value; and
      (iv) a maintaining step, operable when the time average of the feedback signal over the selected period of time is substantially zero, comprising maintaining the time average of the feedback signal over the selected period of time at a substantially zero value.

23. The method of claim 22 comprising:
   generating an embedding signal by experimental time series embedding; and
   producing the feedback signal, said producing the feedback signal step being responsive to the embedding signal.

24. The method of claim 22 wherein the nonlinear system comprises a laser system.

25. The method of claim 24 wherein said controlling step of paragraph (b) comprises producing a feedback signal having the waveform of a series of pulses separated by null signals, the pulse duration being shorter than the duration of the null signals.

26. The method of claim 22 wherein the nonlinear system is an electronic system.

27. The method of claim 22 wherein the nonlinear system is a chemical system.

28. The method of claim 22 wherein the nonlinear system is an excitable cell membrane.

29. The method of claim 22 wherein said controlling step of paragraph (b) comprises:
   producing an output reference signal having an output reference value;
   a step responsive to the output reference signal of producing the feedback signal; and
   reducing the time average of the feedback signal over the selected period of time by adjusting the output reference value when the time average of the feedback signal over the selected period of time is substantially nonzero.

30. The method of claim 29 wherein:
   said nonlinear system operates in an operating state in phase space;
   said step of producing the output reference signal comprises a step functionally dependent on the distance in phase space between the operating state and a reference orbit of producing the feedback signal; and
   said controlling step of paragraph (b) comprises reducing the time average of the feedback signal over the selected period of time by adjusting the reference orbit when the time average of the feedback signal over the selected period of time is substantially nonzero.

31. The method of claim 22 wherein said controlling step of paragraph (b) comprises:
   sampling and averaging the feedback signal over the selected period of time to produce an adjustment signal; and
   producing the feedback signal, said producing step being responsive to the output signal and to the adjustment signal.

32. A method for tracking the operation of a nonlinear system, said method comprising the steps:
   (a) generating a parametric signal at an initial time with an initial selected value and at least one subsequent time with at least one subsequent value different from the initial value; and
   (b) controlling the nonlinear system at the initial time and at the at least one subsequent time, said controlling step being responsive to the parametric signal and comprising the steps:
      (i) a modulator step responsive to the parametric signal and to a feedback signal comprising producing and applying an input signal to the nonlinear system to cause the nonlinear system to produce an output signal; and
      (ii) a producing step responsive to the output signal comprising producing the feedback signal so that the time average of the feedback signal over a selected period of time is substantially zero.

33. The method of claim 32 comprising:
   generating an embedding signal by experimental time series embedding;
   producing the parametric signal, said producing the parametric signal step being responsive to the embedding signal; and
   producing the feedback signal, said producing the feedback signal step being responsive to the embedding signal.

34. The method of claim 32 for tracking the operation of a nonlinear system, wherein said generating step of paragraph (a) comprises the steps subsequent to the initial time of varying the value of the parametric signal slowly with respect to said controlling step of paragraph (b).

35. The method of claim 34 for tracking the operation of a nonlinear system comprising the steps:
   selecting an orbit for tracking; and
   applying the parametric signal to said controlling step of paragraph (b) so that the nonlinear system operates on the selected orbit.

36. The method of claim 35 comprising generating an embedding signal by experimental time series embedding, wherein the orbit selection step and the control step of claim 17 are dependent on the embedding signal.

37. The method of claim 34 wherein the nonlinear system comprises a laser system.

38. The method of claim 37 wherein said controlling step of paragraph (b) comprises producing a feedback signal having the waveform of a series of pulses separated by null signals, the pulse duration being shorter than the duration of the null signals.

39. The method of claim 32 wherein the nonlinear system is an electronic system.

40. The method of claim 32 wherein the nonlinear system is a chemical system.

41. The method of claim 32 wherein the nonlinear system is an excitable cell membrane.

42. The method of claim 32 wherein said controlling step of paragraph (b) comprises:
   (i) a correcting step, operable at the at least one subsequent time when the time average of the feedback signal over the selected period of time is substantially nonzero, of bringing the time average of the feedback signal over the selected period of time from a substantially nonzero value to a substantially zero value; and
   (ii) a maintaining step, operable at the at least one subsequent time when the time average of the feedback signal over the selected period of time is substantially zero, of maintaining the time average of the feedback signal over the selected period of time at a substantially zero value.

43. A system for controlling the operation of a nonlinear system in the nonchaotic realm, said system comprising:
   (a) means for generating a parametric signal; and
   (b) means responsive to the parametric signal for controlling the nonlinear system, said controlling means comprising:
      (i) a modulator responsive to the parametric signal and to a feedback signal for producing and applying an input signal to the nonlinear system to cause the nonlinear system to produce a nonchaotic output signal; and
      (ii) means responsive to the output signal for producing the feedback signal having a substantially zero time average over a selected period of time.

44. The system of claim 43 wherein said controlling means of paragraph (b) comprises:
   (i) correcting means, operable when the time average of the feedback signal over the selected period of time is substantially nonzero, for bringing the time average of the feedback signal over the selected period of time from a substantially nonzero value to a substantially zero value; and
   (ii) maintaining means, operable when the time average of the feedback signal over the selected period of time is substantially zero, for maintaining the time average of the feedback signal over the selected period of time at a substantially zero value.

* * * * *